(12) United States Patent
Li et al.

(10) Patent No.: US 10,506,648 B2
(45) Date of Patent: Dec. 10, 2019

(54) CONTROL METHOD AND LOCAL CONTROL PLANE DEVICE

(71) Applicant: HUAWEI TECHNOLOGIES CO., LTD., Shenzhen, Guangdong (CN)

(72) Inventors: Yan Li, Beijing (CN); Fangyuan Zhu, Beijing (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 57 days.

(21) Appl. No.: 15/908,225

(22) Filed: Feb. 28, 2018

(65) Prior Publication Data

US 2018/0192456 A1 Jul. 5, 2018

Related U.S. Application Data

(63) Continuation of application No. PCT/CN2015/090270, filed on Sep. 22, 2015.

(51) Int. Cl.
*H04W 76/12* (2018.01)
*H04W 76/14* (2018.01)
(Continued)

(52) U.S. Cl.
CPC .......... *H04W 76/12* (2018.02); *H04W 28/085* (2013.01); *H04W 76/11* (2018.02);
(Continued)

(58) Field of Classification Search
CPC ..... H04W 76/12; H04W 76/14; H04W 76/11; H04W 28/085; H04W 60/00; H04W 88/16; H04W 72/0406; H04W 76/27
See application file for complete search history.

(56) References Cited

U.S. PATENT DOCUMENTS

| | | | |
|---|---|---|---|
| 2010/0278108 A1* | 11/2010 | Cho | H04W 76/12 370/328 |
| 2015/0230166 A1 | 8/2015 | Casati et al. | |
| 2017/0265245 A1* | 9/2017 | Yang | H04W 76/20 |

FOREIGN PATENT DOCUMENTS

| | | |
|---|---|---|
| CN | 102550083 A | 7/2012 |
| CN | 102843779 A | 12/2012 |

(Continued)

OTHER PUBLICATIONS

"Signaling reduction for UE state transitions," Ericsson, SA WG2 Meeting #110, 3GPP, Dubrovnik, Croatia, S2-152667, Jun. 6-10, 2015.

(Continued)

*Primary Examiner* — Hashim S Bhatti
(74) *Attorney, Agent, or Firm* — Womble Bond Dickinson (US) LLP

(57) ABSTRACT

Embodiments of the present disclosure disclose a control method, the method is applied to a wireless communications system, and the wireless communications system includes user equipment, a base station, a gateway device, a local control plane device, and a remote control plane device. The method includes: obtaining, by the local control plane device, context information of the user equipment from the remote control plane device according to an interaction process between the user equipment and the remote control plane device; and setting up, by the local control plane device according to the context information of the user equipment, a radio bearer between the user equipment and a base station in which a current camping cell of the user equipment is located.

20 Claims, 18 Drawing Sheets

(51) Int. Cl.
*H04W 76/11* (2018.01)
*H04W 28/08* (2009.01)
H04W 76/27 (2018.01)
H04W 72/04 (2009.01)
H04W 88/16 (2009.01)
H04W 60/00 (2009.01)

(52) U.S. Cl.
CPC ............ *H04W 76/14* (2018.02); *H04W 60/00* (2013.01); *H04W 72/0406* (2013.01); *H04W 76/27* (2018.02); *H04W 88/16* (2013.01)

(56) References Cited

FOREIGN PATENT DOCUMENTS

| | | |
|---|---|---|
| CN | 103546985 A | 1/2014 |
| CN | 104823483 A | 8/2015 |
| EP | 2 604 052 B1 | 10/2014 |
| WO | 2010126326 A2 | 11/2010 |
| WO | 2012/019615 A1 | 2/2012 |

OTHER PUBLICATIONS

International Search Report dated Jun. 21, 2016 in corresponding International Patent Application No. PCT/CN2015/090270.
Extended European Search Report dated Jul. 19, 2018 in corresponding European Patent Application No. 15904346.2, 8 pgs.

\* cited by examiner

CONTROL METHOD AND LOCAL CONTROL PLANE DEVICE

CROSS-REFERENCE TO RELATED APPLICATIONS

This application is a continuation of International Application No. PCT/CN2015/090270, filed on Sep. 22, 2015, the disclosure of which is hereby incorporated by reference in its entirety.

TECHNICAL FIELD

The present disclosure relates to the field of wireless communications technologies, and in particular, to a control method and a local control plane device.

BACKGROUND

Currently, 3GPP (3rd Generation Partnership Project) proposes a brand-new EPS (evolved packet system) network including UE (user equipment), an eNB (Evolutional Node B, E-UTRAN Node B), an SGW (Serving Gateway), a PGW (packet data network gateway), and an MME (mobility management entity). The SGW serves as a forwarding plane anchor between access networks, and the PGW serves as a forwarding plane anchor between an access network and a non-access network. To ensure continuity of IP addresses of the UE, the PGW is deployed at a relatively high position. In this way, even if the UE moves, the UE always keeps connection to the PGW, thereby ensuring that an IP address remains unchanged. However, if the UE accesses a local server, a route recurvation problem occurs, that is, data of the UE first arrives at the PGW at a relatively high position, and then returns to the local server. Consequently, a packet transmission delay gets longer.

To resolve this problem, 3GPP defines an SIPTO (Selected IP Traffic Offload) function. A core idea of the SIPTO function is to deploy the SGW and the PGW at low positions. When the UE accesses the local server, a local PGW allocates an IP address, and data passes through only a local SGW and the local PGW, thereby avoiding route recurvation, and resolving a problem of an extremely long packet transmission delay. However, a disadvantage of deploying the SGW and the PGW at low positions is that the SGW and the PGW are relatively far away from a centrally deployed MME, and consequently a signaling transmission delay gets longer when the UE switches from an idle state to an active state. Therefore, another method for reducing the signaling transmission delay is to shift the MME downwards to a low position and deploy the MME and the local gateway together. However, this greatly reduces a quantity of UEs managed by each MME. When UE moves, the UE tends to switch between different MMEs, and consequently signaling interaction increases, and system load increases.

SUMMARY

Embodiments of the present disclosure provide a control method and a local control plane device, to reduce a signaling transmission delay caused when user equipment switches from an idle state to an active state, and to avoid a problem of excessive signaling interaction caused by frequent control plane switching due to a movement of the user equipment.

A first aspect of an embodiment of the present disclosure provides a control method, where the method is applied to a wireless communications system, the wireless communications system includes user equipment, a base station, a gateway device, a local control plane device, and a remote control plane device, and the method includes:

obtaining, by the local control plane device, context information of the user equipment from the remote control plane device according to an interaction process between the user equipment and the remote control plane device; and setting up, by the local control plane device according to the context information of the user equipment, a radio bearer between the user equipment and a base station in which a current camping cell of the user equipment is located.

A second aspect of an embodiment of the present disclosure provides a local control plane device, the local control plane device is applied to a wireless communications system, the wireless communications system further includes user equipment, a base station, a gateway device, and a remote control plane device, and the local control plane device includes:

an information obtaining module, configured to obtain context information of the user equipment from the remote control plane device according to an interaction process between the user equipment and the remote control plane device; and a bearer setup module, configured to set up, by the local control plane device according to the context information of the user equipment, a radio bearer between the user equipment and a base station in which a current camping cell of the user equipment is located.

It can be learned from the foregoing that, in the embodiments of the present disclosure, the local control plane device obtains the context information of the user equipment from the remote control plane device according to the interaction process between the user equipment and the remote control plane device, and further sets up, according to the context information of the user equipment, the radio bearer between the user equipment and the base station in which the current camping cell of the user equipment is located. Therefore, a signaling transmission delay caused when the user equipment switches from an idle state to an active state can be reduced, and a problem of excessive signaling interaction caused by frequent control plane switching due to a movement of the user equipment can be avoided.

BRIEF DESCRIPTION OF DRAWINGS

To describe embodiments of the present disclosure more clearly, the following briefly describes the accompanying drawings required for describing the embodiments.

DESCRIPTION OF EMBODIMENTS

The following clearly describes the technical solutions in the embodiments of the present disclosure with reference to the accompanying drawings in the embodiments of the present disclosure.

The technical solutions of the embodiments of the present disclosure may be applied to various communications systems, such as: a Global System of Mobile Communications (GSM) system, a Code Division Multiple Access (CDMA) system, a Wideband Code Division Multiple Access (WCDMA) system, a general packet radio service (GPRS), a Long Term Evolution (LTE) system, an LTE frequency division duplex (FDD) system, an LTE time division duplex (TDD), a Universal Mobile Telecommunications System (UMTS), or a Worldwide Interoperability for Microwave Access (WiMAX) communications system.

In the embodiments of the present disclosure, user equipment (UE) may include a terminal, a mobile station (MS), a mobile terminal, and the like. The user equipment may communicate with one or more core networks through a radio access network (RAN). For example, the user equipment may be a mobile phone (also referred to as a "cellular" phone) or a computer with a mobile terminal. For example, the user equipment may also be a portable, pocket-sized, handheld, computer built-in, or in-vehicle mobile apparatus, which exchanges voice and/or data with the radio access network. In the embodiments of the present disclosure, a base station may be an E-UTRAN NodeB (Evolutional Node B, "eNB") in LTE.

Figure 1:
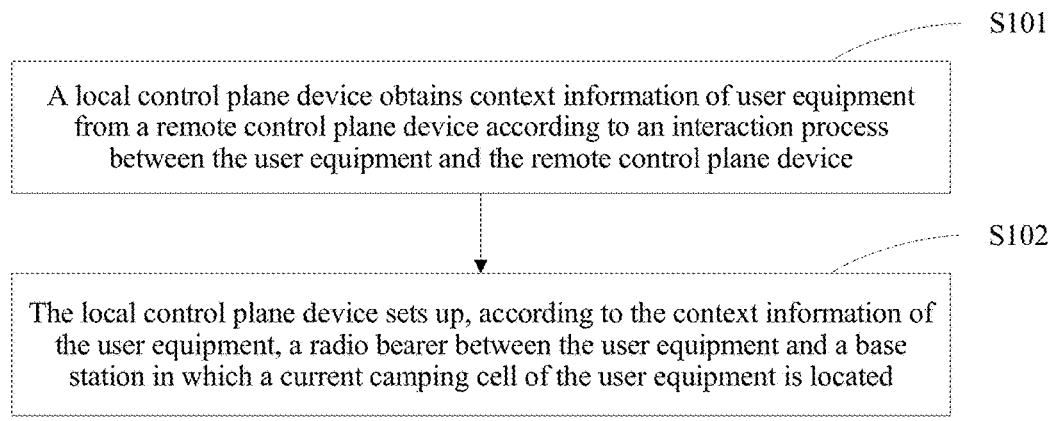
FIG. 1 is a schematic flowchart of a control method according to an embodiment of the present disclosure.

FIG. 1 is a schematic flowchart of a control method according to an embodiment of the present disclosure. The method is applied to a wireless communications system, and the wireless communications system includes user equipment, a base station, a gateway device, a local control plane device, and a remote control plane device. As shown in the figure, a process of the control method in this embodiment may include the following steps.

S101. The local control plane device obtains context information of the user equipment from the remote control plane device according to an interaction process between the user equipment and the remote control plane device.

The context information of the user equipment includes at least a security context and a bearer context (including a user-plane address and a user-plane TEID-U of an SGW, a TAI (tracking area identity) list, a GUTI (globally unique temporary identity), a control-plane TEID-C allocated by an MME, and a TEID-C allocated by the SGW). The TEID (Tunnel Endpoint ID) is a tunnel endpoint identifier.

Optionally, the interaction process between the user equipment and the remote control plane device includes an attach request process and a packet data network (PDN) connection setup process that are initiated by the user equipment.

Specifically, the local control plane device obtains the context information of the user equipment from the remote control plane device according to the interaction process between the user equipment and the remote control plane device in the following two manners:

Manner 1: In the interaction process between the user equipment and the remote control plane device, the local control plane device forwards, to the gateway device, forwarding plane modification information sent by the remote control plane device, where the forwarding plane modification information carries the context information of the user equipment. Further, the local control plane device may obtain the context information of the user equipment by parsing the forwarding plane modification information.

It should be noted that the forwarding plane modification information herein may be a bearer modification request in an application scenario described in FIG. 2A, FIG. 2B, and FIG. 2C in the following. That is, when forwarding, to the gateway device, a bearer modification request sent by the remote control plane device, the local control plane device parses the context information of the user equipment carried in the bearer modification request. Alternatively, the forwarding plane modification information herein may be a downlink data forwarding rule modification message in an application scenario described in FIG. 4A, FIG. 4B, and FIG. 4C in the following. That is, when forwarding, to the gateway device, a downlink data forwarding rule modification message sent by the remote control plane device, the local control plane device parses the context information of the user equipment carried in the downlink data forwarding rule modification message.

Manner 2: In the interaction process between the user equipment and the remote control plane device, the local control plane device forwards, to the gateway device, forwarding plane modification information sent by the remote control plane device, and receives the context information of the user equipment directly sent by the remote control plane device.

S102. The local control plane device sets up, according to the context information of the user equipment, a radio bearer between the user equipment and a base station in which a current camping cell of the user equipment is located.

Specifically, after receiving a service request sent by the user equipment via the base station in which the current camping cell of the user equipment is located, the local control plane device sends a context setup request to the base station according to the context information of the user equipment, so that the base station sets up the radio bearer between the base station and the user equipment.

It should be noted that sending the service request by the user equipment via the base station in which the current camping cell of the user equipment is located may be triggered by a downlink data arrival notification. In a specific implementation process, when the user equipment is in an idle state, the local control plane device initiates paging to the user equipment according to the context information of the user equipment after receiving a downlink data arrival notification message, so that the user equipment switches from the idle state to an active state, and sends the service request via the base station in which the current camping cell is located.

In addition, when the user equipment performs a cross-domain movement to a new tracking area range, a base station to which the user equipment belongs changes, and a local control plane device and a gateway device change. Therefore, the source local control plane device and the source gateway device delete the stored context information of the user equipment. In a specific implementation process, after receiving a context deletion request sent by the remote control plane device, the source local control plane device deletes the stored context information of the user equipment and sends the context deletion request to the source gateway device, so that the source gateway device deletes the stored context information of the user equipment. It should be noted that the source gateway device herein includes a source SGW but does not include a source PGW.

Further, after the local control plane device sets up the radio bearer between the base station and the user equipment, the local control plane device processes paging and service request processes of the user equipment. When the user equipment switches from an idle state to an active state, the local control plane device sends a user state modification notification to the remote control plane device, so that the remote control plane device modifies state information of the user equipment.

It can be learned from the foregoing that, in this embodiment of the present disclosure, the local control plane device is introduced into an existing wireless network system and has the following functions: a signaling proxy between the base station and the remote control plane device and a signaling proxy between the remote control plane device and the local gateway device. The local control plane device may store a bearer context and a security context of a user, and a user TAI list, and is responsible for the paging and service request processes of the user. Other processes are still processed by the remote control plane device in the existing wireless network system. In this embodiment of the present disclosure, some functions of the remote control plane device in the existing wireless network system are deployed in a distributed manner, so that paging and service request functions can be locally implemented. Therefore, a time required for signaling transmission is reduced, a shorter time required for switching from an idle state to an active state is provided for an ultra-low delay application, and an initial packet transmission delay is reduced.

Figure 2A:
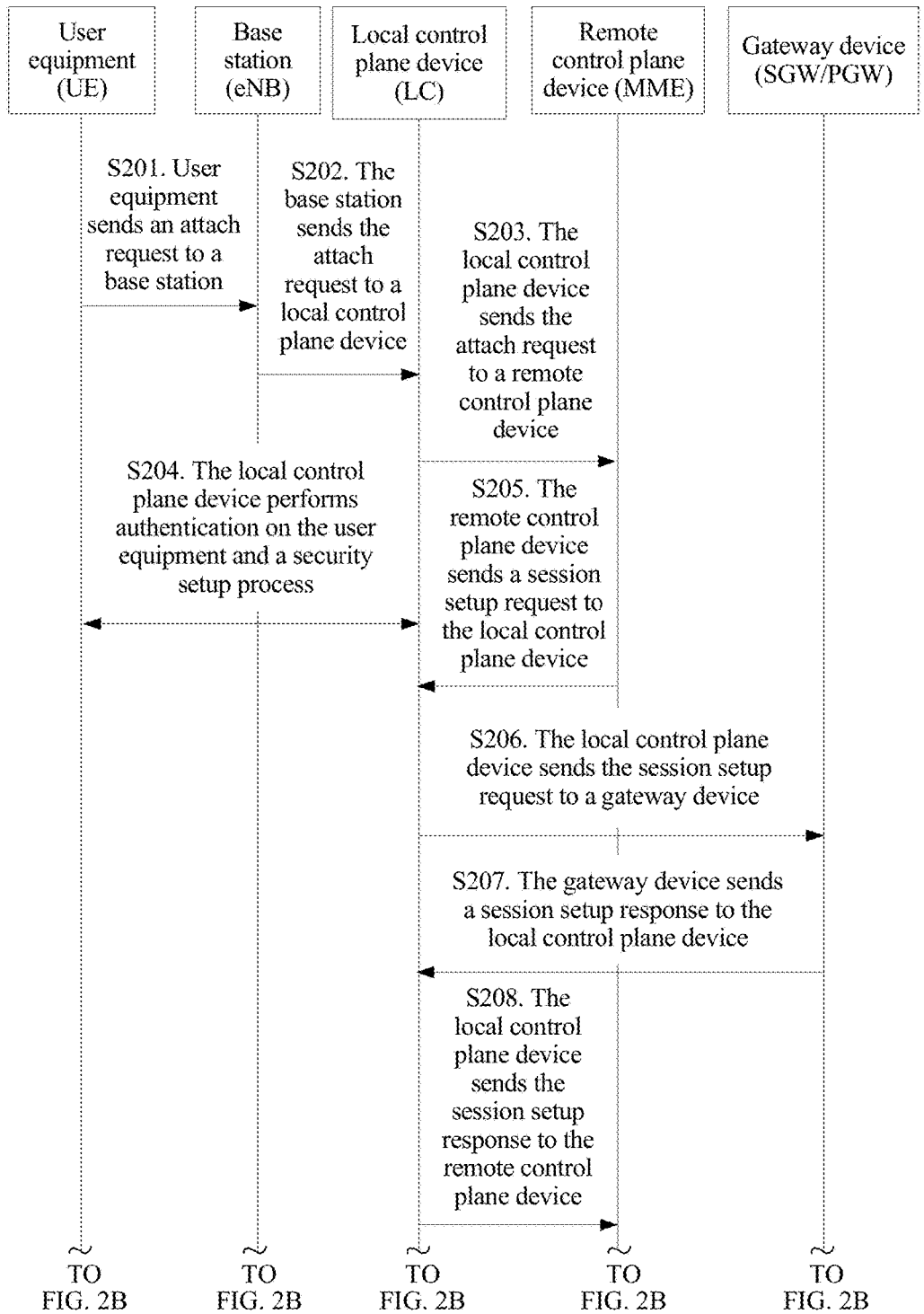
FIG. 2A, FIG. 2B, and FIG. 2C are a schematic flowchart of a control method according to a first embodiment of the present disclosure.
Figure 2B:
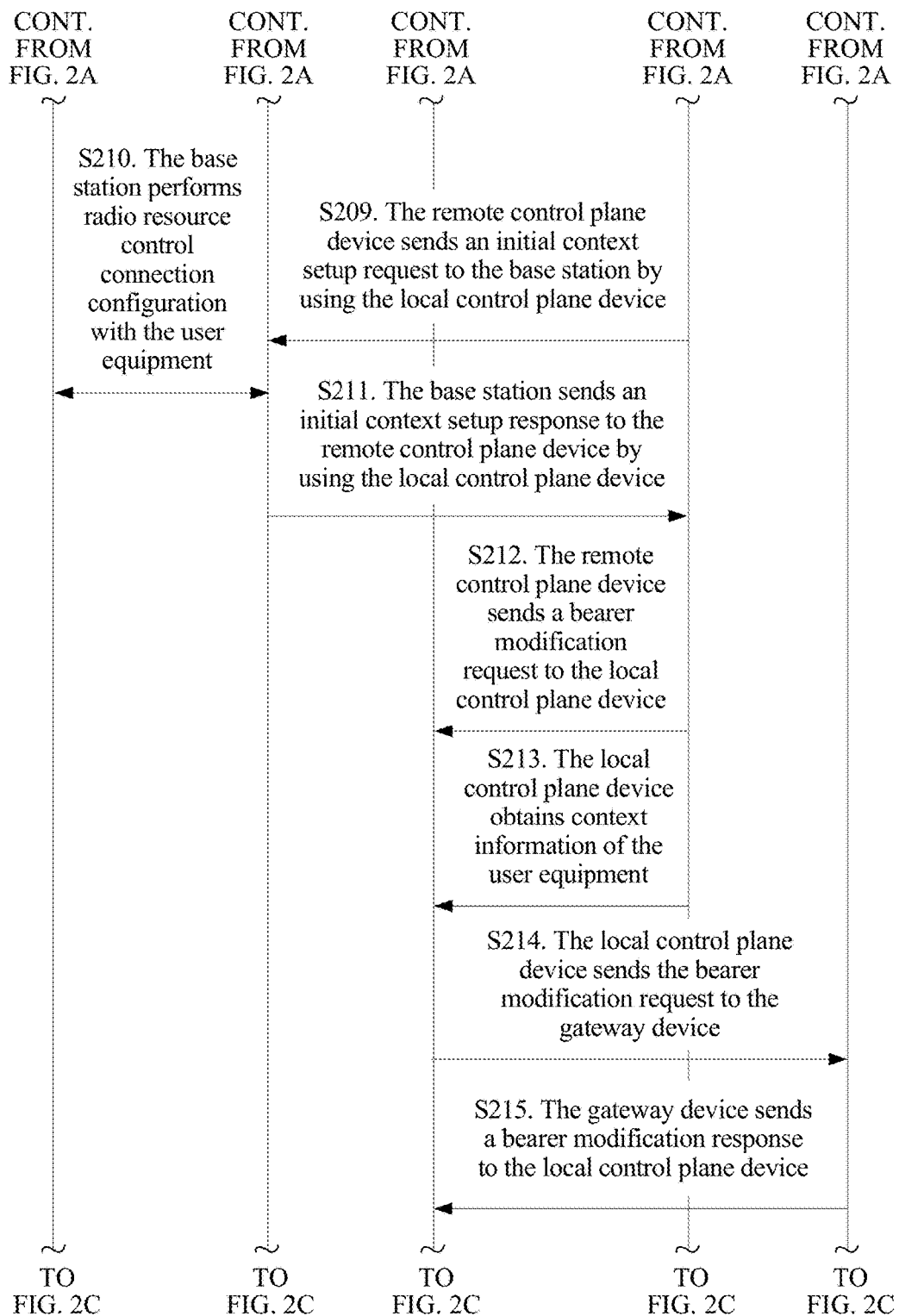
Figure 2C:
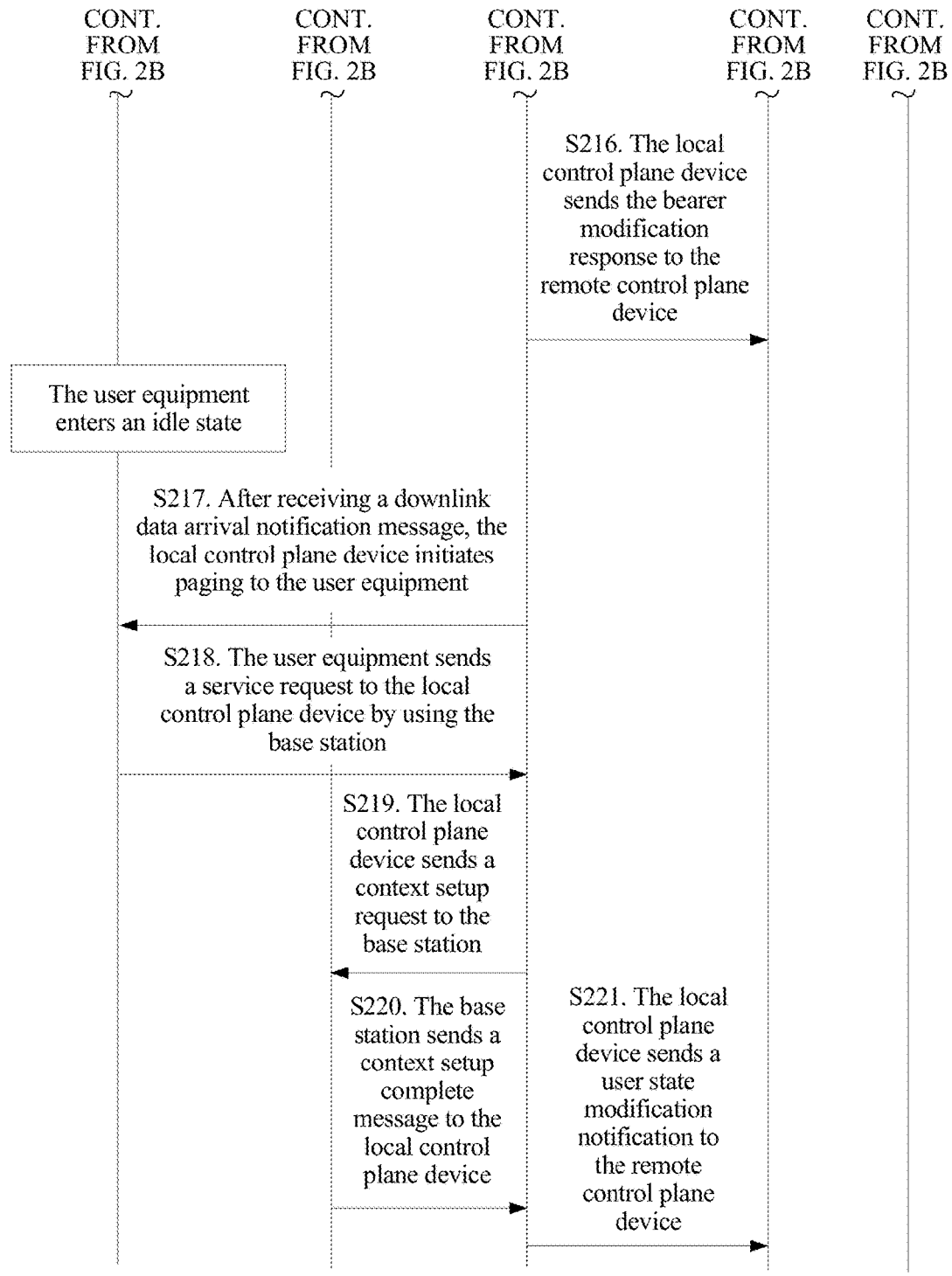
Figure 3A:
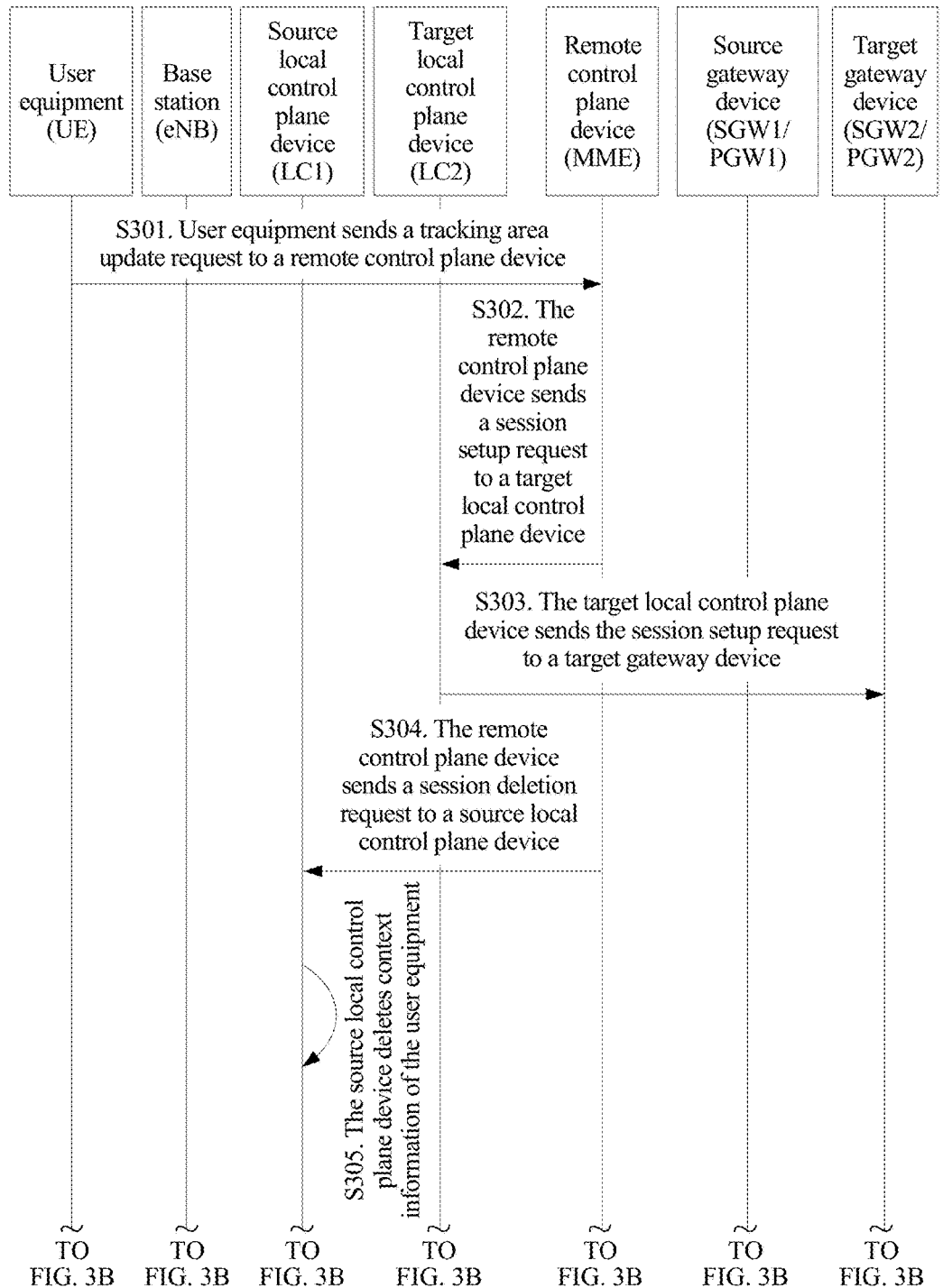
FIG. 3A, FIG. 3B, FIG. 3C, and FIG. 3D are a schematic flowchart of another control method according to a first embodiment of the present disclosure.
Figure 3B:
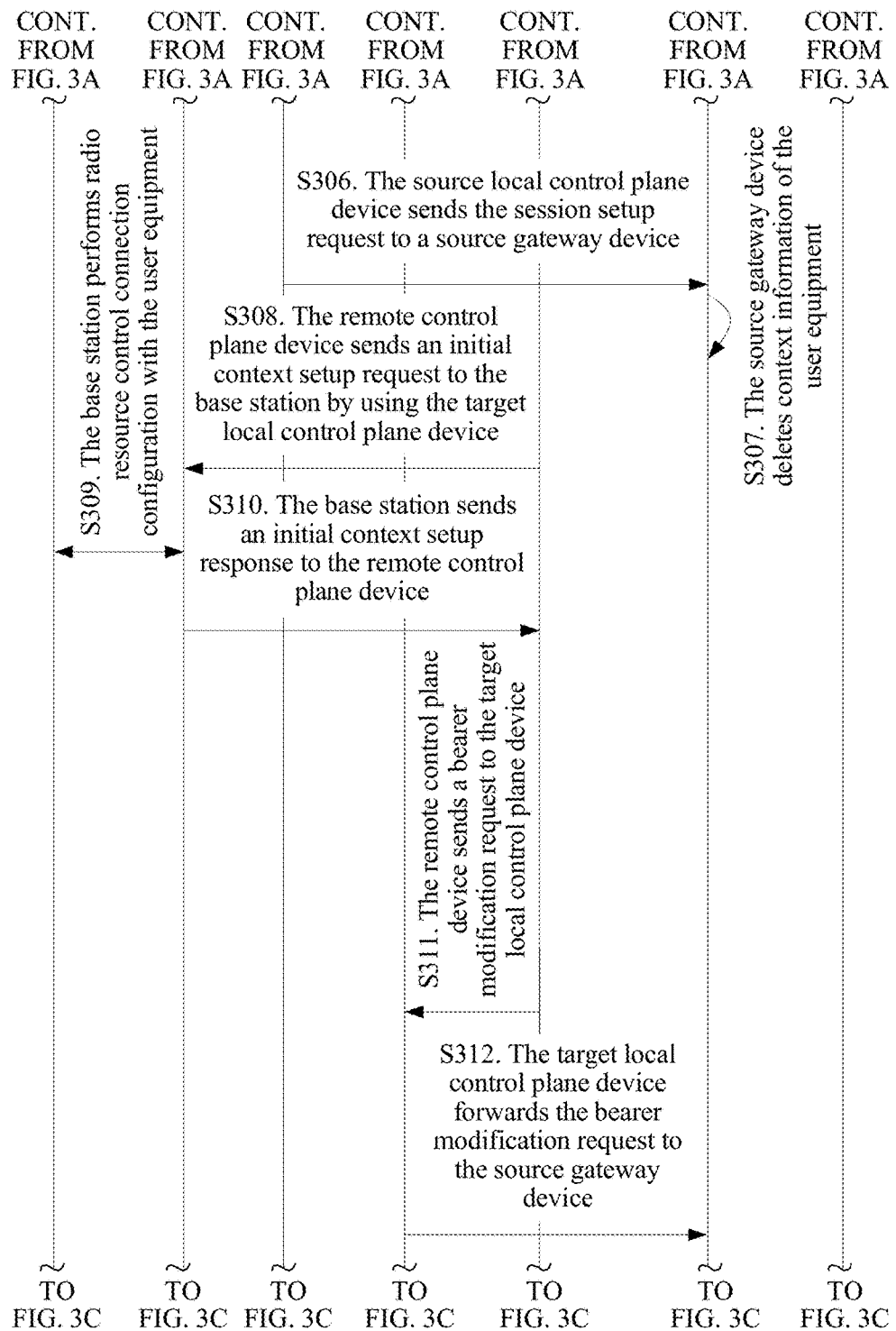
Figure 3C:
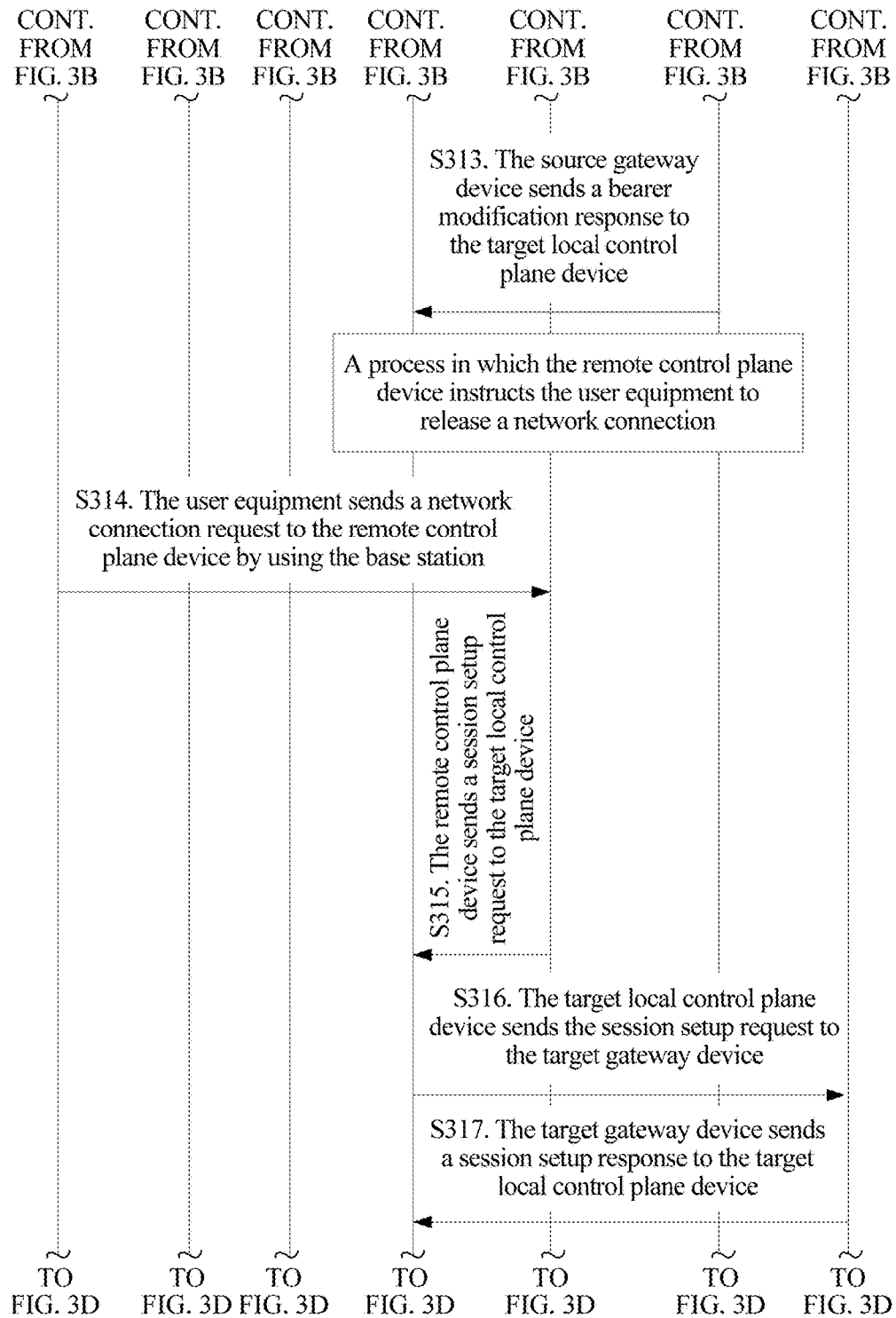
Figure 3D:
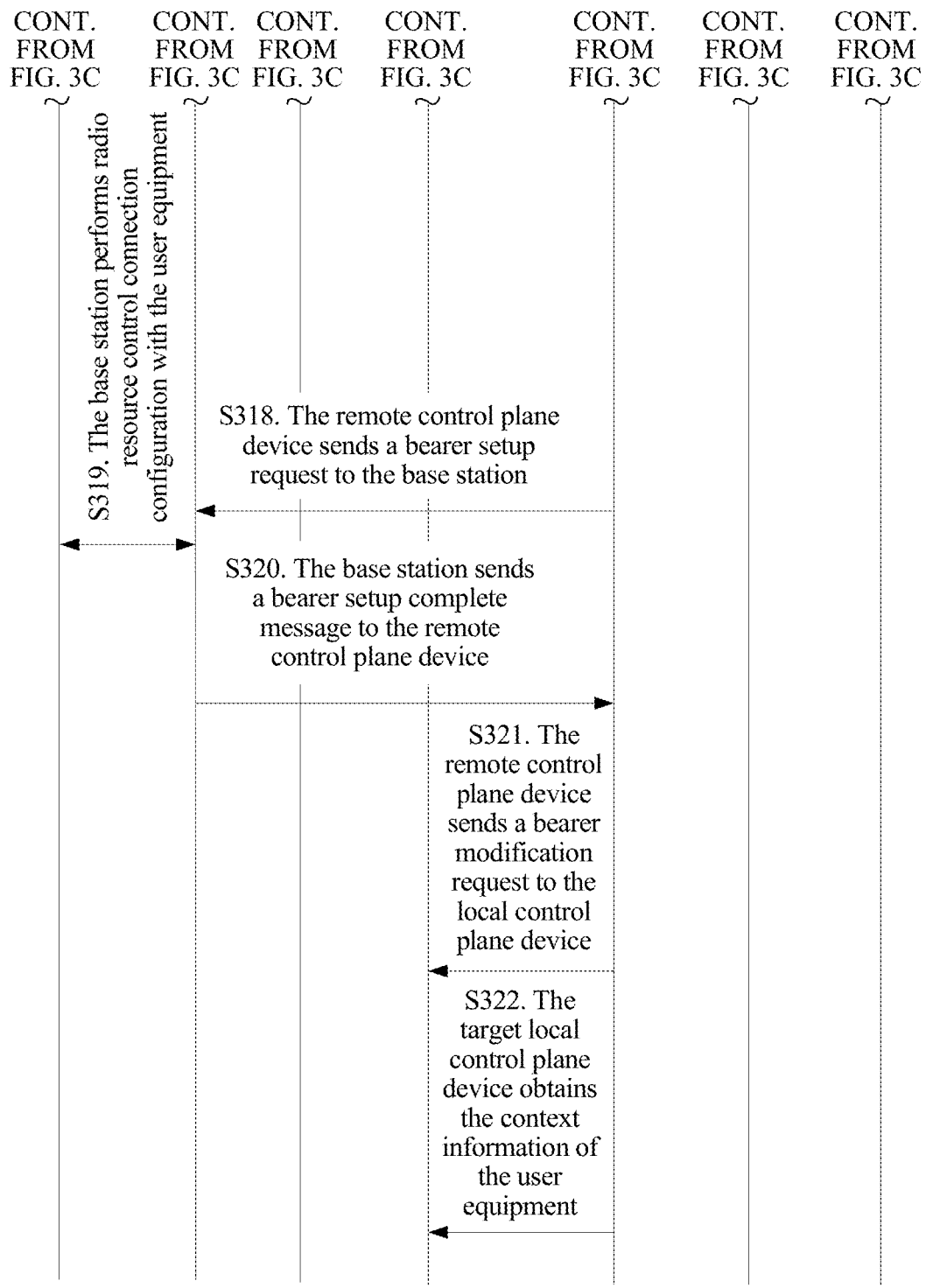

FIG. 2A, FIG. 2B, and FIG. 2C are a schematic flowchart of a control method according to a first embodiment of the present disclosure. The method is applied to a wireless communications system, and the wireless communications system includes user equipment, a base station, a gateway device, a local control plane device, and a remote control plane device.

Figure 10:
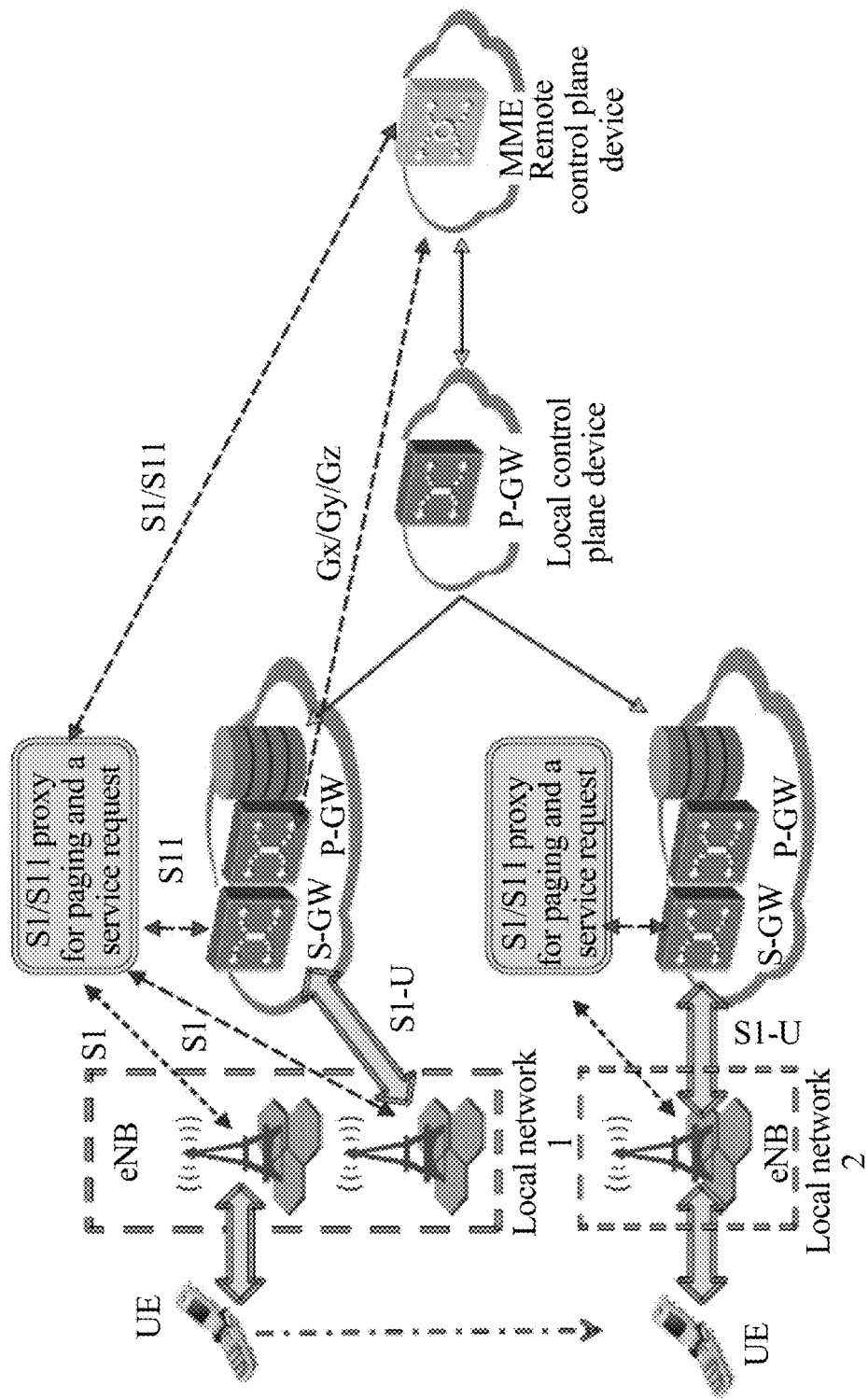
FIG. 10 is a schematic diagram of an architecture of a wireless communications system according to a first embodiment of the present disclosure.

FIG. 10 is a schematic diagram of an architecture of the wireless communications system according to the first embodiment of the present disclosure. As shown in the figure, on the basis of a centralized gateway deployment scenario of SIPTO (Selected IP Traffic Offload) of a macro network, a new function entity: the local control plane device (Local Control, LC), is introduced into the architecture. The local control plane device integrates an offloading function with an SGW and a PGW, and is close to an access network. In the figure, an S1 interface is an interface between a remote control plane and the base station, and an S11 interface is an interface between the remote control plane and the SGW. A local control plane is a signaling proxy between the two interfaces, serves as an MME for the base station and the SGW, and serves as a base station and an SGW for the remote control plane. The gateway device includes the SGW/PGW, and the remote control plane device includes an MME in a conventional network architecture.

As shown in FIG. 2A, FIG. 2B, and FIG. 2C, a process of the control method in this embodiment may include the following steps.

S201. The user equipment sends an attach request to the base station.

Specifically, the UE sends the attach request to an eNB to initiate a network attach process. The attach request carries an IMSI (international mobile subscriber identity), a core network capability, a PDN type, and a selected PLMN (public land mobile network) of the UE.

S202. The base station sends the attach request to the local control plane device.

Specifically, the eNB sends an S1AP initial UE message to the local control plane device, and the S1AP initial UE message carries the attach request.

S203. The local control plane device sends the attach request to the remote control plane device.

Specifically, the local control plane device sends the attach request to the MME.

S204. The local control plane device performs authentication on the user equipment and a security setup process.

Specifically, if there is no context information of the UE in a network, the MME performs authentication on the UE and a NAS (network attached storage) security setup process. Subsequently, all NAS messages are protected by a NAS security function indicated by the MME.

S205. The remote control plane device sends a session setup request to the local control plane device.

Specifically, the MME sends the session setup request to the local control plane device. The session setup request includes information such as an EPS bearer identity, an APN (access point name) of the UE, a control-plane MME TEID, default EPS bearer QoS (Quality of Service), and a PDN type.

S206. The local control plane device sends the session setup request to the gateway device.

Specifically, the local control plane device forwards the session setup request to the SGW/PGW.

S207. The gateway device sends a session setup response to the local control plane device.

Specifically, the SGW/PGW returns the session setup response. The session setup response includes information such as the PDN type, an SGW user-plane address and TEID, an SGW control-plane TEID, the EPS bearer identity, EPS bearer QoS, and a PGW address and TEID.

S208. The local control plane device sends the session setup response to the remote control plane device.

Specifically, the local control plane device forwards the session setup response to the MME.

S209. The remote control plane device sends an initial context setup request to the base station by using the local control plane device.

Specifically, the MME sends the S1AP initial context setup request to the eNB. The S1AP initial context setup request carries an attach accept message. In addition, the S1AP message includes information such as a security context of the UE, the EPS bearer QoS, the EPS bearer identity, and the SGW user-plane address and TEID. The attach accept message includes information such as a GUTI, the PDN type, a PDN address, an APN, and a TAI list.

S210. The base station performs radio resource control connection configuration with the user equipment.

Specifically, a process of the RRC (radio resource control) connection configuration is completed between the eNB and the UE.

S211. The base station sends an initial context setup response to the remote control plane device by using the local control plane device.

Specifically, the eNB returns an initial context setup response message. The initial context setup response message includes an address and a TEID of an eNB that transmits downlink data on an S1-U interface, and an attach complete message of the UE.

S212. The remote control plane device sends a bearer modification request to the local control plane device.

Specifically, the MME sends the bearer modification request to the local control plane device. The bearer modification request includes the EPS bearer identity, and the address and TEID of the eNB.

S213. The local control plane device obtains context information of the user equipment.

Specifically, the local control plane device obtains the context information of the UE from the MME in the following two manners:

Manner 1: The bearer modification request sent by the MME carries the context information of the UE. The local control plane device may obtain the context information of the UE by parsing the bearer modification request.

Manner 2: The local control plane device receives the context information of the UE that is directly sent by the MME.

The context information of the UE includes the security context, the bearer context (which already includes a user-plane address, a user-plane TEID-U of the SGW, the TAI list, the GUTI, a control-plane TEID-C allocated by the MME, and a TEID-C allocated by the SGW herein). The local control plane device stores this information.

S214. The local control plane device sends the bearer modification request to the gateway device.

Specifically, the local control plane device forwards the bearer modification request to the SGW/PGW.

S215. The gateway device sends a bearer modification response to the local control plane device.

Specifically, the SGW/PGW returns the bearer modification response. The bearer modification response carries the EPS bearer identity.

S216. The local control plane device sends the bearer modification response to the remote control plane device.

Specifically, the local control plane device notifies the MME of a bearer modification response message.

S217. After receiving a downlink data arrival notification message, the local control plane device initiates paging to the user equipment.

Specifically, after the UE enters an idle state and has the downlink data arrival notification message, the local control plane device determines stored context information according to the TEID-C allocated by the MME, obtains the TAI list, and sends paging messages to all eNBs in the TAI list to which the UE belongs, where the paging message carries an S-TMSI (some information of the GUTI). The eNB initiates paging to the UE.

S218. The user equipment sends a service request to the local control plane device via the base station.

Specifically, the UE responds to the paging message, enters an active state again, and sends the service request to the local control plane device. The service request carries the S-TMSI.

S219. The local control plane device sends a context setup request to the base station.

Specifically, the local control plane device finds, according to the S-TMSI, a bearer context (including the EPS bearer QoS, the EPS bearer identity, the SGW user-plane address, and the SGW user-plane TEID-U) and a security context that are correspondingly stored, sends an initial context setup request message to the eNB, sets up a transmission tunnel between the eNB and the SGW/PGW according to the stored bearer context, and sends the security context to the eNB to ensure secure transmission between the UE and the eNB.

S220. The base station sends a context setup complete message to the local control plane device.

Specifically, after completing a user-plane radio bearer setup process, the eNB returns an initial context setup complete message to the local control plane device. The initial context setup complete message carries an address and a TEID of an eNB that are used to transmit downlink data on the S1 interface, an EPS bearer list accepted by the eNB, and optionally, a rejected EPS bearer list.

Further, the local control plane device sends the bearer modification request to the SGW/PGW. The bearer modification request carries the TEID-C allocated by the SGW, the EPS bearer list (the address and user-plane TEID of the eNB that transmits downlink data on the S1 interface) accepted by the eNB, and optionally, the EPS bearer list rejected by the eNB.

S221. The local control plane device sends a user state modification notification to the remote control plane device.

Specifically, because the UE switches from an idle state to an active state, the local control plane device notifies the MME of a latest state of the UE. A purpose of this is to avoid repeatedly paging to the UE when the MME needs to convey signaling to the UE. In addition, in the foregoing process, if there is a rejected EPS bearer, the MME needs to delete the EPS bearer rejected on a core network.

FIG. 3A, FIG. 3B, FIG. 3C, and FIG. 3D are a schematic flowchart of another control method according to a first embodiment of the present disclosure. As shown in the figure, a process of the control method in this embodiment may include the following steps.

S301. User equipment sends a tracking area update request to a remote control plane device.

It should be noted that when the UE performs a cross-domain movement to a new tracking area, the UE sends the TA (tracking area) update request to an MME to trigger a TA update process.

S302. The remote control plane device sends a session setup request to a target local control plane device.

Specifically, the MME stores context information of the UE and sends the session setup request to the target local control plane device. The session setup request carries an MME address, a control-plane TEID, and a bearer context (including an address of a source PGW1).

S303. The target local control plane device sends the session setup request to a target gateway device.

Specifically, the target local control plane device transmits the session setup request to an SGW2.

Further, the SGW2 sends a bearer modification request according to the address of the PGW1 and sets up an S5 connection from the SGW2 to the PGW1.

S304. The remote control plane device sends a session deletion request to a source local control plane device.

Specifically, the MME sends the session deletion request to the source local control plane device. The session deletion request carries a TEID-C allocated by the MME.

S305. The source local control plane device deletes context information of the user equipment.

Specifically, the source local control plane device deletes the corresponding context information according to the TEID-C allocated by the MME.

S306. The source local control plane device sends the session deletion request to a source gateway device.

Specifically, the source local control plane device sends the session deletion request to an SGW1.

S307. The source gateway device deletes context information of the user equipment.

Specifically, the SGW1 deletes the corresponding context information.

S308. The remote control plane device sends an initial context setup request to a base station by using the target local control plane device.

Specifically, the MME sends the initial context (including an SGW user-plane address and TEID-U) setup request to the base station by using the target local control plane device. The initial context setup request includes a TA update accept message (a GUTI, a TAI list, and an EPS bearer status).

S309. The base station performs radio resource control connection configuration with the user equipment.

Specifically, after receiving the initial context setup request, the eNB performs RRC connection reconfiguration to set up a radio bearer between the eNB and the UE. In addition, the UE deletes a local resource of a bearer that is not marked as "active" in the received EPS bearer status, and returns an RRC connection reconfiguration complete message.

S310. The base station sends an initial context setup response to the remote control plane device.

Specifically, the eNB sends the initial context setup response to the MME to return an address and a TEID of an eNB that transmits downlink data on an S1 interface.

S311. The remote control plane device sends a bearer modification request to the target local control plane device.

Specifically, the MME sends the bearer modification request to the target local control plane device. The bearer modification request includes an EPS bearer identity, and the address and TEID of the eNB.

S312. The target local control plane device forwards the bearer modification request to the source gateway device.

S313. The source gateway device sends a bearer modification response to the target local control plane device.

Specifically, the SGW1/PGW1 sends the bearer modification response to the target local control plane device. The bearer modification response includes the EPS bearer identity. Then, the target local control plane device notifies the MME of the bearer modification response, so that the MME instructs the UE to release a PDN connection between the SGW2 and the PGW1 and delete all bearer contexts in a PDN connection process, and instructs the UE to initiate a PDN connection re-setup process and set up a PDN connection between the local SGW2 and a PGW2.

S314. The user equipment sends a network connection request to the remote control plane device via the base station.

Specifically, the UE sends a PDN connection request to the MME via the eNB.

S315. The remote control plane device sends a session setup request to the target local control plane device.

Specifically, the MME sends the session setup request to the target local control plane device. The session setup request includes information such as an address of the target PGW2, the EPS bearer identity, an APN of a user, a control-plane MME TEID-C, default EPS bearer QoS, and a PDN type.

S316. The target local control plane device sends the session setup request to the target gateway device.

Specifically, the target local control plane device transmits a session setup request message to the SGW2.

S317. The target gateway device sends a session setup response to the target local control plane device.

Specifically, the SGW2 sends the bearer modification request according to the address of the PGW2, sets up an S5 connection from the SGW2 to the PGW2, and then returns the session setup response to the target local control plane device. In addition, the returned session setup response includes information such as a PDN type, an S-GW user-plane address and TEID, an S-GW control-plane TEID, an EPS bearer identity, EPS bearer QoS, and a P-GW address and TEID.

S318. The remote control plane device sends a bearer setup request to the base station.

Specifically, the MME sends the bearer setup request to the UE via the eNB. The bearer setup request carries a PDN connection accept message (an APN, the PDN type, a PDN address, and the EPS bearer identity) and includes the EPS bearer QoS and the S-GW user-plane address and TEID.

S319. The base station performs radio resource control connection configuration with the user equipment.

Specifically, RRC connection reconfiguration is completed between the eNB and the UE.

S320. The base station sends a bearer setup complete message to the remote control plane device.

Specifically, the eNB returns the bearer setup complete message to the MME. The bearer setup complete message includes an address and a TEID of an eNB that transmits downlink data on S1-U. Then, the UE sends a direct transmission message including a PDN connection complete message to the eNB.

Further, the eNB sends the bearer setup complete message to the MME. The bearer setup complete message carries the PDN connection complete message.

S321. The remote control plane device sends a bearer modification request to the target local control plane device.

Specifically, the MME sends the bearer modification request to the target local control plane device. The bearer modification request includes the EPS bearer identity, and the address and TEID of the eNB.

S322. The target local control plane device obtains the context information of the user equipment.

Specifically, the target local control plane device obtains the context information of the UE in the following two manners:

Manner 1: The bearer modification request sent by the MME carries the context information of the UE. The target local control plane device may obtain the context information of the UE by parsing the bearer modification request.

Manner 2: The target local control plane device receives the context information of the UE that is directly sent by the MME.

The context information of the UE includes the security context, the bearer context (which already includes a user-plane address, a user-plane TEID-U of the SGW, the TAI list, the GUTI, a control-plane TEID-C allocated by the MME, and a TEID-C allocated by the SGW herein). The local control plane device stores this information.

Further, the target local control plane device forwards the bearer modification request to the SGW2/PGW2, and further the SGW2/PGW2 returns the bearer modification response including the EPS bearer identity.

It can be learned from the foregoing that, in this embodiment of the present disclosure, the local control plane is responsible for paging and service request processes and has S1 signaling and S11 signaling proxy functions. A signaling transmission path and time are greatly shortened, signaling interaction caused by frequent switching between MMEs in the prior art is avoided, and frequently updating user location information by an HSS caused by mobility of the UE is also avoided.

Figure 4A:
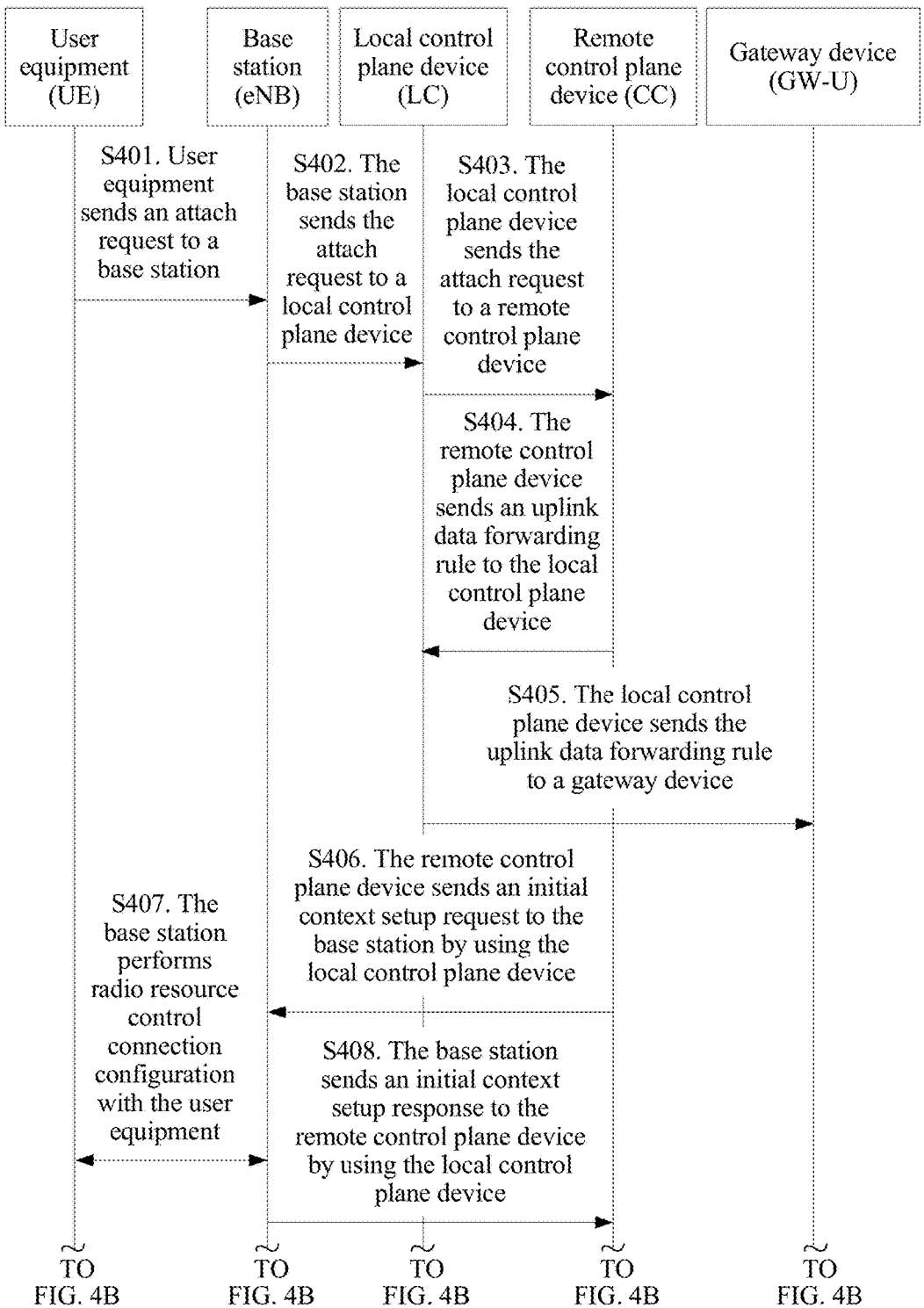
FIG. 4A, FIG. 4B, and FIG. 4C are a schematic flowchart of a control method according to a second embodiment of the present disclosure.
Figure 4B:
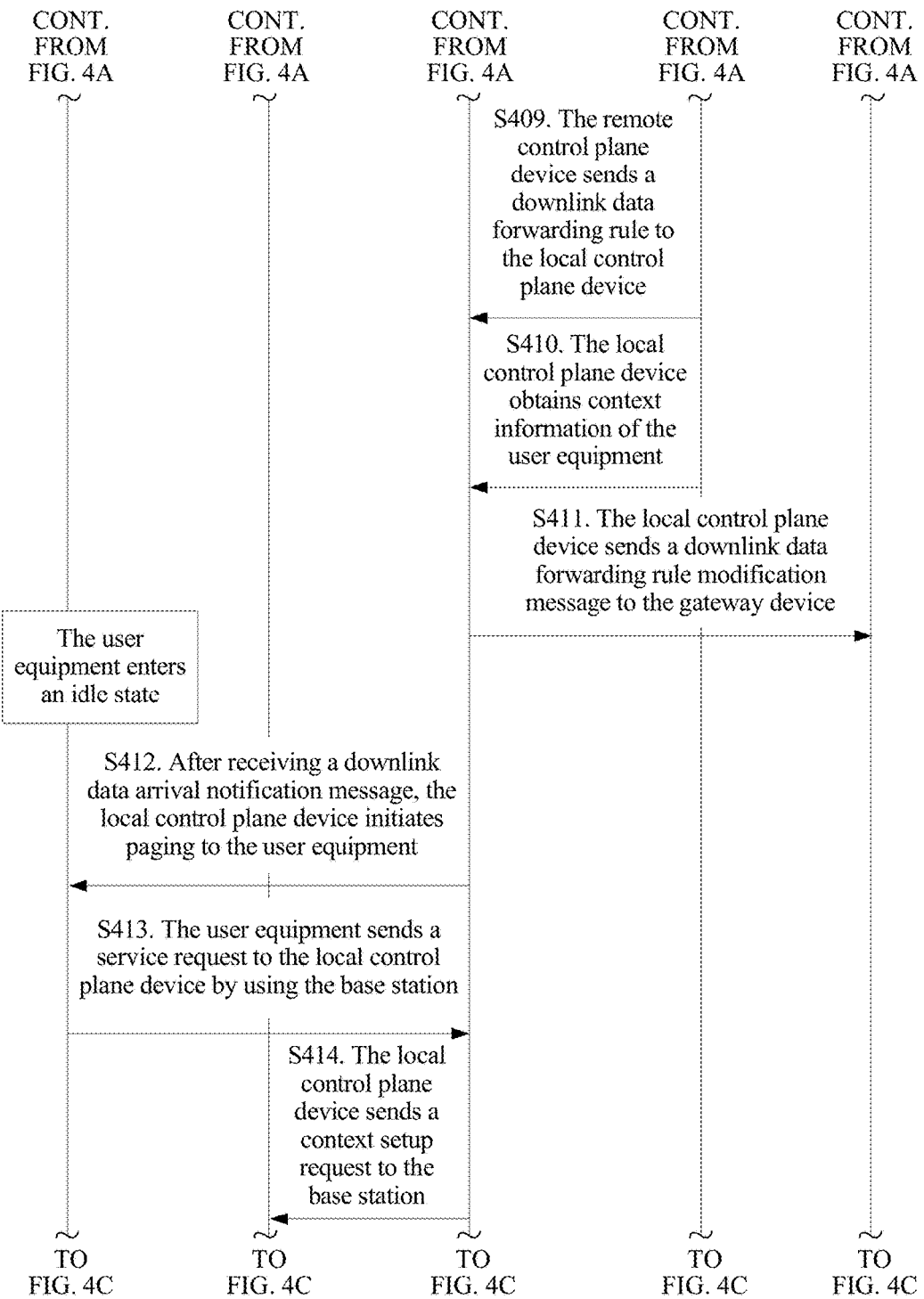
Figure 4C:
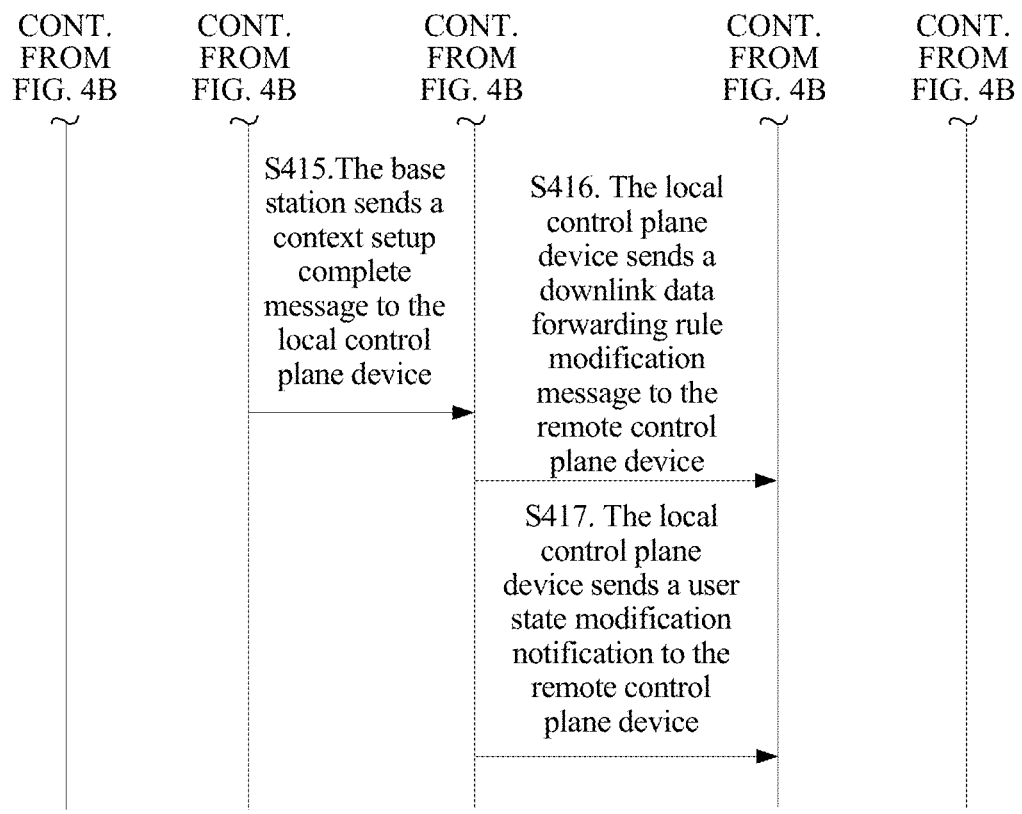

FIG. 4A, FIG. 4B, and FIG. 4C are a schematic flowchart of a control method according to a second embodiment of the present disclosure. The method is applied to a wireless communications system, and the wireless communications system includes user equipment, a base station, a gateway device, a local control plane device, and a remote control plane device.

Figure 11:
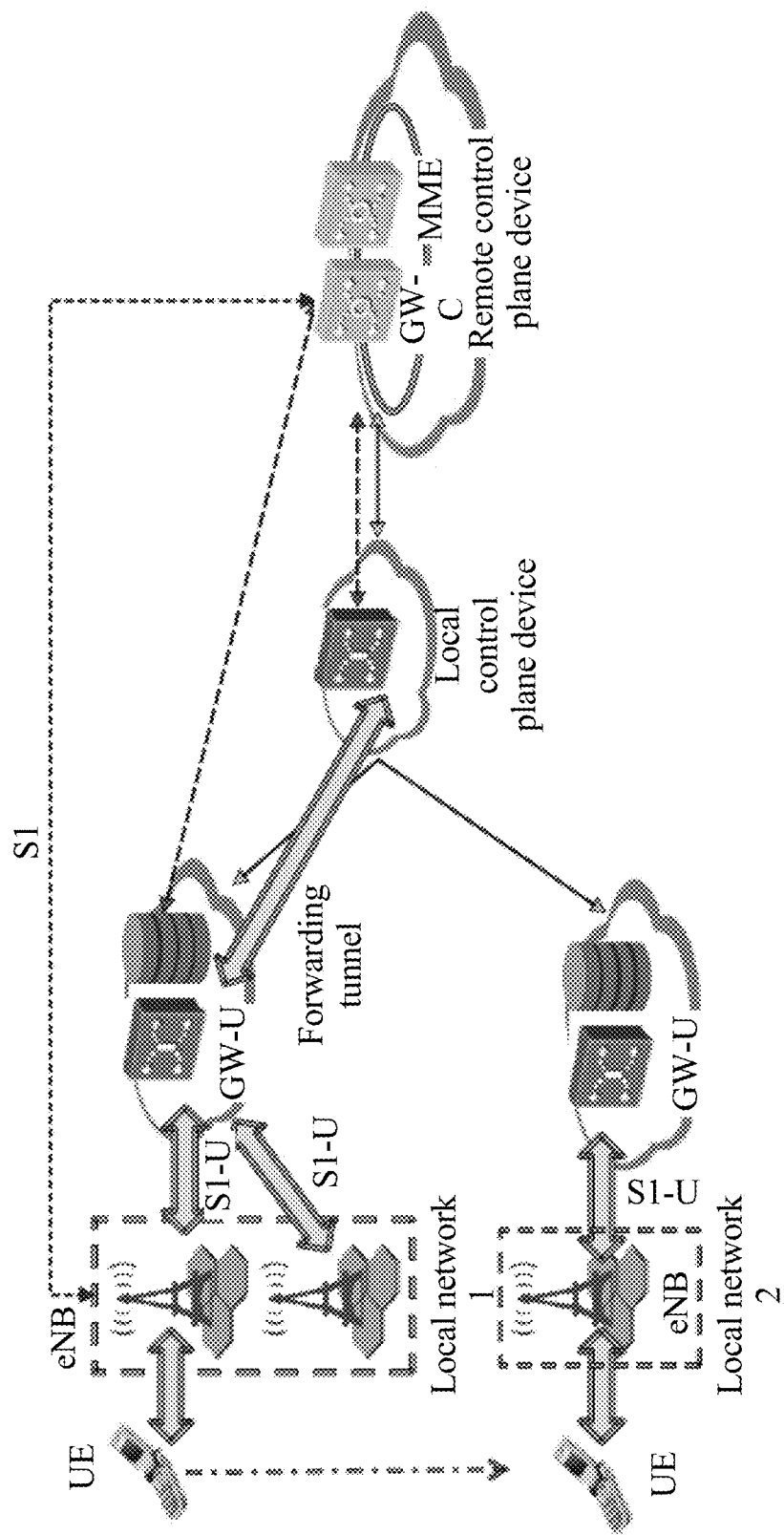
FIG. 11 is a schematic diagram of an architecture of a wireless communications system according to a second embodiment of the present disclosure.

FIG. 11 is a schematic diagram of an architecture of the wireless communications system according to the second embodiment of the present disclosure. As shown in the figure, on the basis of a mobile network architecture in which forwarding is separated, a local control plane device is introduced into the architecture. A control plane function (GW-C) and a forwarding plane function (GW-U) of a gateway device are decoupled. A control plane function obtained by decoupling, and an MME, a PCRF (policy and charging rules function), and the like in a conventional network architecture are combined into a remote control plane device that is alternatively referred to as a central control plane device (Central Control, CC). A forwarding plane function (SGW-U) of an SGW and a forwarding plane function (PGW-U) of a PGW are combined into a gateway device (GW-U), and a mobile flow interface is a reference point used after data forwarding of the gateway is separated.

As shown in FIG. 4A, FIG. 4B, and FIG. 4C, a process of the control method in this embodiment may include the following steps.

S401. The user equipment sends an attach request to the base station.

Specifically, the UE sends the attach request to an eNB.

S402. The base station sends the attach request to the local control plane device.

Specifically, the eNB sends the attach request to the local control plane device.

S403. The local control plane device sends the attach request to the remote control plane device.

Specifically, the local control plane device forwards the attach request to the remote control plane device, so that authentication is completed between the remote control plane device and the UE.

S404. The remote control plane device sends an uplink data forwarding rule to the local control plane device.

Specifically, the remote control plane device allocates an uplink tunnel identifier, and delivers the uplink data forwarding rule. The uplink data forwarding rule includes index information.

S405. The local control plane device sends the uplink data forwarding rule to the gateway device.

Specifically, the local control plane device sends the uplink data forwarding rule to the GW-U, so that the GW-U performs forwarding according to the uplink data forwarding rule.

S406. The remote control plane device sends an initial context setup request to the base station by using the local control plane device.

Specifically, the remote control plane device sends the initial context setup request to the eNB. The initial context setup request includes the allocated uplink tunnel identifier.

S407. The base station performs radio resource control connection configuration with the user equipment.

Specifically, RRC connection configuration is completed between the eNB and the UE.

S408. The base station sends an initial context setup response to the remote control plane device by using the local control plane device.

Specifically, the eNB returns the initial context setup response to a control plane. The initial context setup response includes a downlink tunnel ID allocated by the eNB and an attach complete message.

S409. The remote control plane device sends a downlink data forwarding rule to the local control plane device.

The downlink data forwarding rule includes index information that indicates a manner in which the GW-U sends an IP packet to the UE.

S410. The local control plane device obtains context information of the user equipment.

Specifically, the local control plane device obtains the context information of the UE in the following two manners:

Manner 1: A downlink data forwarding rule modification message sent by the remote control plane device carries the context information of the UE. The local control plane device may obtain the context information of the UE by parsing the downlink data forwarding rule modification message.

Manner 2: The local control plane device receives the context information of the UE that is directly sent by the remote control plane device.

The context information of the UE includes a UE security context, a bearer context, a TAI list, a GUTI, and index information of uplink and downlink data forwarding rules. The local control plane device stores this information.

S411. The local control plane device sends a downlink data forwarding rule modification message to the gateway device.

Specifically, the local control plane device notifies the GW-U of the downlink data forwarding rule.

S412. After receiving a downlink data arrival notification message, the local control plane device initiates paging to the user equipment.

Specifically, when the user equipment enters an idle state, the GW-U matches the downlink data forwarding rule, buffers downlink data, and sends the downlink data arrival notification message to the local control plane device. The downlink data arrival notification message includes index information corresponding to the downlink data forwarding rule. The local control plane device determines a corresponding TAI list of the UE according to the index information of the downlink data forwarding rule, and sends paging messages to all eNBs in the TAI list to which the UE belongs. The message carries an S-TMSI (some information of the GUTI), so that the eNB initiates paging to the UE.

S413. The user equipment sends a service request to the local control plane device via the base station.

Specifically, the UE responds to the paging message, enters an active state again, and sends the service request to the local control plane device. The service request carries the S-TMSI (some information of the GUTI).

S414. The local control plane device sends a context setup request to the base station.

Specifically, the local control plane device finds, according to the S-TMSI, a bearer context (including EPS bearer QoS, an EPS bearer identity, and the uplink tunnel identifier) and a security context that are correspondingly stored, and sends the initial context setup request to the eNB, so that the eNB sets up a transmission tunnel between the eNB and the GW-U according to the stored bearer context, and sends the security context to the eNB to ensure secure transmission between the UE and the eNB.

S415. The base station sends a context setup complete message to the local control plane device.

Specifically, after completing a user-plane radio bearer setup process, the eNB returns the initial context setup complete message. The initial context setup complete message includes a tunnel identifier of an eNB that transmits downlink data.

S416. The local control plane device sends a downlink data forwarding rule modification message to the remote control plane device.

Specifically, after obtaining the tunnel identifier of the eNB, the local control plane device updates the downlink data forwarding rule of the UE according to a buffered downlink data forwarding rule index, and sets up a transmission tunnel between the eNB and the GW-U, so that the GW-U sends a buffered packet to the eNB.

S417. The local control plane device sends a user state modification notification to the remote control plane device.

Specifically, because the UE switches from an idle state to an active state, the local control plane device notifies the remote control plane device of a latest state of the UE.

Figure 5A:
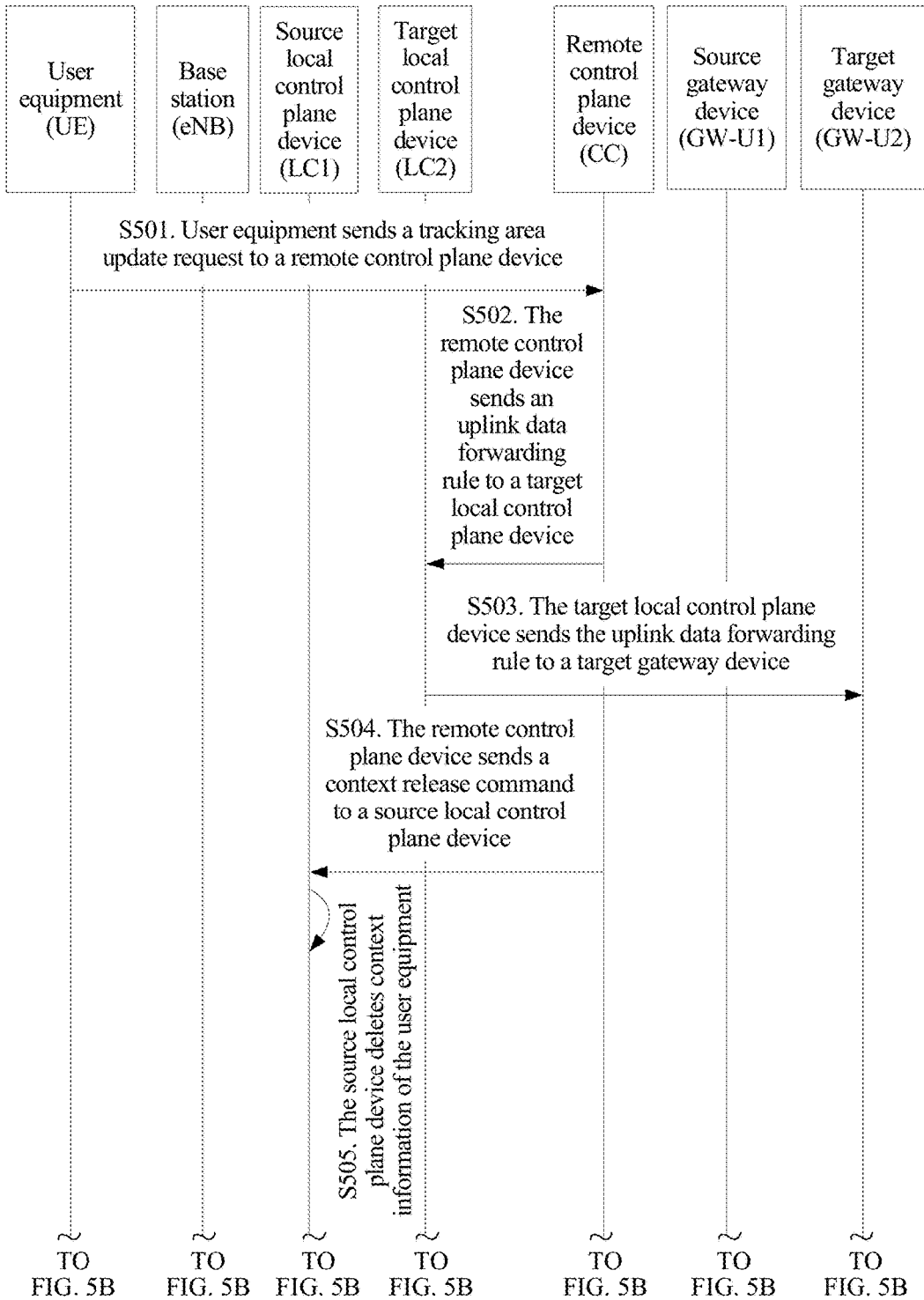
FIG. 5A, FIG. 5B, and FIG. 5C are a schematic flowchart of another control method according to a second embodiment of the present disclosure.
Figure 5B:
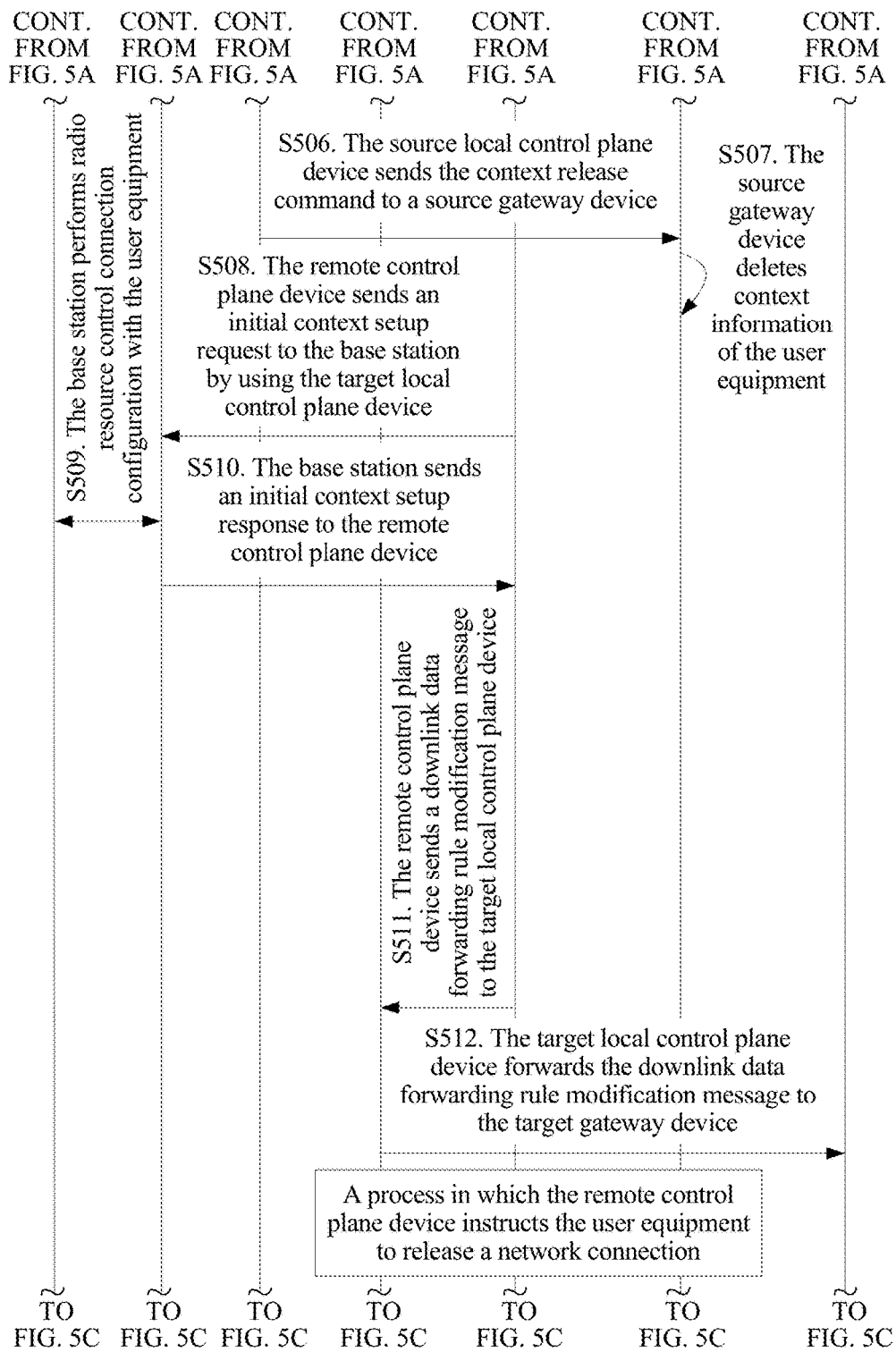
Figure 5C:
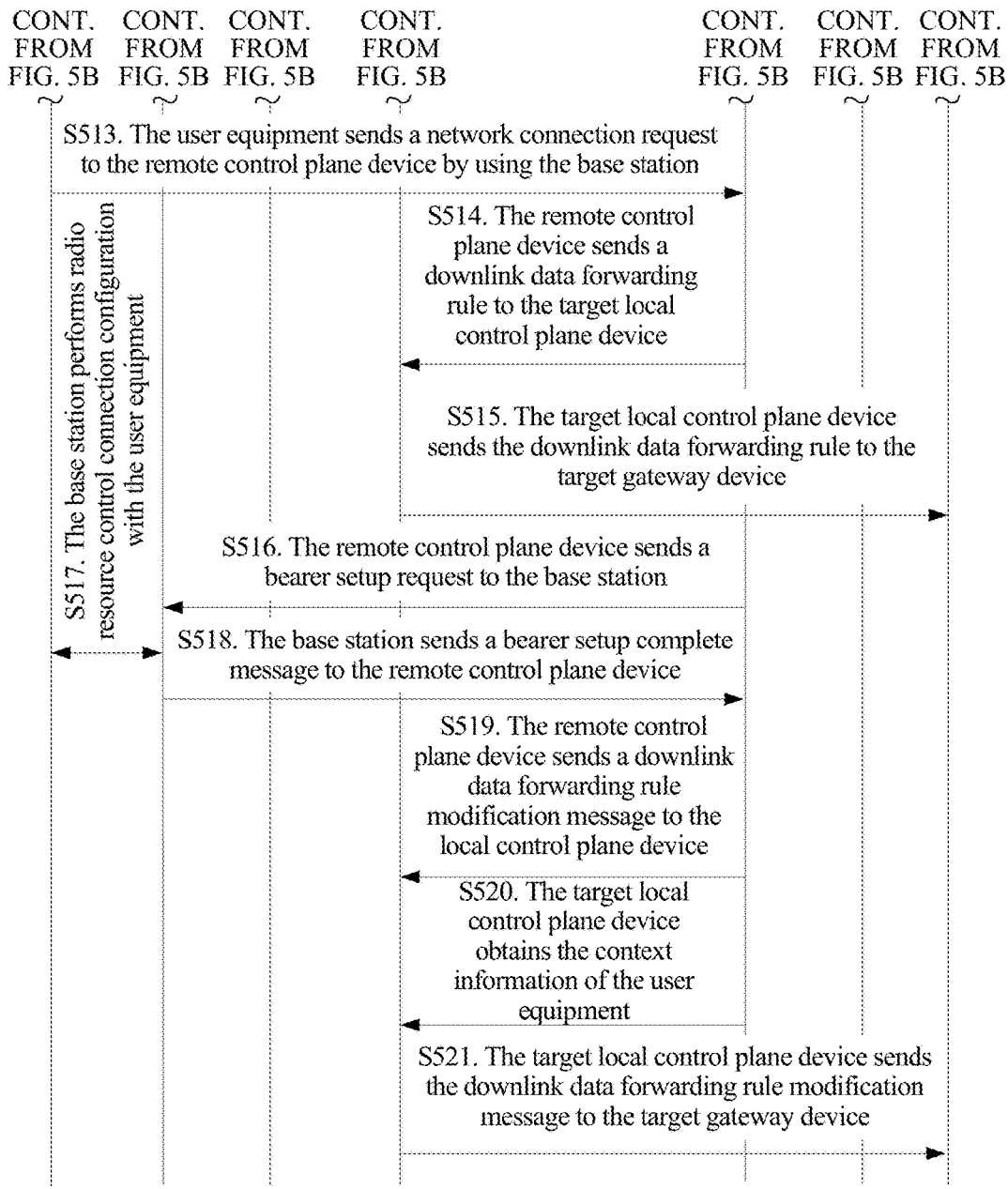

FIG. 5A, FIG. 5B, and FIG. 5C are a schematic flowchart of another control method according to a second embodiment of the present disclosure. As shown in the figure, a process of the control method in this embodiment may include the following steps.

S501. User equipment sends a tracking area update request to a remote control plane device.

It should be noted that when the UE performs a cross-domain movement to a new tracking area range, the UE sends the TA update request to the remote control plane device to trigger a TA update process.

S502. The remote control plane device sends an uplink data forwarding rule to a target local control plane device.

Specifically, the remote control plane device allocates an uplink tunnel identifier, and delivers the uplink data forwarding rule to the target local control plane device. The uplink data forwarding rule includes index information.

S503. The target local control plane device sends the uplink data forwarding rule to a target gateway device.

Specifically, the target local control plane device instructs a GW-U2 to accept a packet of a tunnel and perform forwarding according to the uplink data forwarding rule.

S504. The remote control plane device sends a context release command to a source local control plane device.

S505. The source local control plane device deletes context information of the user equipment.

Specifically, the source local control plane device deletes the corresponding context information of the UE according to the context release command.

S506. The source local control plane device sends the context release command to a source gateway device.

Specifically, the source local control plane device sends the context release command to a GW-U1.

S507. The source gateway device deletes context information of the user equipment.

Specifically, the GW-U1 deletes the corresponding context information of the UE according to the context release command.

S508. The remote control plane device sends an initial context setup request to a base station by using the target local control plane device.

Specifically, the remote control plane device sends the initial context setup request to the base station. The initial context setup request includes the allocated uplink tunnel identifier, and carries a TAU accept message. The TAU accept message includes information such as a GUTI, a PDN type, a PDN address, an APN, and a TAI list.

S509. The base station performs radio resource control connection configuration with the user equipment.

S510. The base station sends an initial context setup response to the remote control plane device.

Specifically, the eNB returns the initial context setup response to the remote control plane device. The initial context setup response includes a downlink tunnel ID allocated by the eNB.

S511. The remote control plane device sends a downlink data forwarding rule modification message to the target local control plane device.

Specifically, the remote control plane device sends the downlink data forwarding rule modification message to the target local control plane device. The downlink data forwarding rule modification message includes index information that indicates a manner in which the GW-U sends an IP packet to the UE.

S512. The target local control plane device forwards the downlink data forwarding rule modification message to the target gateway device.

Specifically, the target local control plane device notifies the GW-U2 of the downlink data forwarding rule modification message.

S513. The user equipment sends a network connection request to the remote control plane device via the base station.

Specifically, the remote control plane device instructs the UE to perform PDN connection release and delete all bearers in a source PDN connection process, and instructs the UE to initiate PDN connection re-setup. In this process, the UE sends the network connection request to the remote control plane device via the eNB.

S514. The remote control plane device sends a downlink data forwarding rule to the target local control plane device.

Specifically, the remote control plane device allocates the uplink tunnel identifier, and delivers the downlink data forwarding rule. The downlink data forwarding rule includes index information that indicates a manner in which the GW-U sends an IP packet to the UE.

S515. The target local control plane device sends the downlink data forwarding rule to the target gateway device.

Specifically, the target local control plane device instructs the GW-U2 to accept a packet of a tunnel and perform forwarding according to the downlink data forwarding rule.

S516. The remote control plane device sends a bearer setup request to the base station.

Specifically, the remote control plane device sends the bearer setup request to the eNB. The bearer setup request carries a PDN connection accept message (the APN, the PDN type, the PDN address, and the EPS bearer identity), and the PDN connection accept message includes the allocated uplink tunnel identifier.

S517. The base station performs radio resource control connection configuration with the user equipment.

S518. The base station sends a bearer setup complete message to the remote control plane device.

It should be noted that, before that, the eNB returns a bearer setup response to the remote control plane device. The bearer setup response includes an address and a TEID of an eNB that transmits downlink data on an S1-U interface. Then, the UE sends a direct transmission message to the eNB, and the direct transmission message includes a PDN connection complete message.

Specifically, the eNB transmits the PDN connection complete message to the remote control plane device.

S519. The remote control plane device sends a downlink data forwarding rule modification message to the local control plane device.

The downlink data forwarding rule modification message includes index information that indicates a manner in which the GW-U sends an IP packet to the UE.

S520. The target local control plane device obtains the context information of the user equipment.

Specifically, the target local control plane device obtains the context information of the UE in the following two manners:

Manner 1: The downlink data forwarding rule modification message sent by the remote control plane device carries the context information of the UE, and the target local control plane device may obtain the context information of the UE by parsing the downlink data forwarding rule modification message.

Manner 2: The target local control plane device receives the context information of the UE that is directly sent by the MME.

The context information of the UE includes a UE security context, a bearer context, the TAI list, the GUTI, and index information of uplink and downlink data forwarding rules. The local control plane device stores this information.

S521. The target local control plane device sends the downlink data forwarding rule modification message to the target gateway device.

It can be learned from the foregoing that in this embodiment of the present disclosure, due to a signaling proxy function of the local control plane device, forwarding by the remote control plane device is not required. A paging and service request process of a user may be locally implemented directly, and a signaling transmission path and time are greatly shortened.

Figure 6:
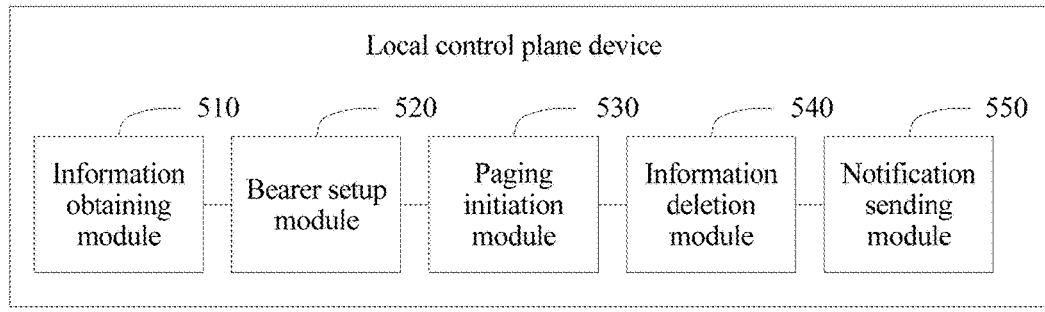
FIG. 6 is a schematic structural diagram of a local control plane device according to an embodiment of the present disclosure.

FIG. 6 is a schematic structural diagram of a local control plane device according to an embodiment of the present disclosure. The local control plane device implements the control methods described in FIG. 1 to FIG. 5A, FIG. 5B, and FIG. 5C. As shown in the figure, the local control plane device in this embodiment of the present disclosure may include at least an information obtaining module 510 and a bearer setup module 520.

The information obtaining module 510 is configured to obtain context information of a user equipment from a remote control plane device according to an interaction process between the user equipment and the remote control plane device.

The context information of the user equipment includes at least a security context and a bearer context (including a user-plane address and a user-plane TEID-U of an SGW, a TAI list, a GUTI, a control-plane TEID-C allocated by an MME, and a TEID-C allocated by the SGW). The TEID is a tunnel endpoint identifier.

Optionally, the interaction process between the user equipment and the remote control plane device includes an attach request process and a PDN connection setup process that are initiated by the user equipment.

Figure 7:
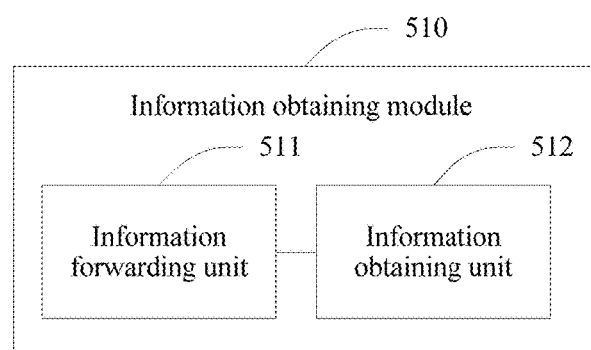
FIG. 7 is a schematic structural diagram of an information obtaining module according to an embodiment of the present disclosure.

In one aspect, as shown in FIG. 7, the information obtaining module 510 may further include an information forwarding unit 511 and an information obtaining unit 512.

The information forwarding unit 511 is configured to: in the interaction process between the user equipment and the remote control plane device, forward, to a gateway device, forwarding plane modification information sent by the remote control plane device, where the forwarding plane modification information carries the context information of the user equipment.

The information obtaining unit 512 is configured to obtain the context information of the user equipment by parsing the forwarding plane modification information.

Figure 8:
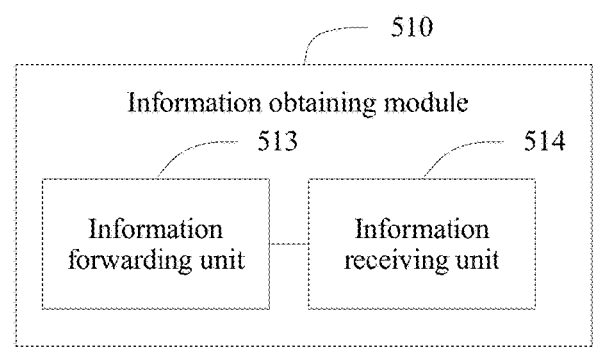
FIG. 8 is a schematic structural diagram of another information obtaining module according to an embodiment of the present disclosure.
Figure 9:
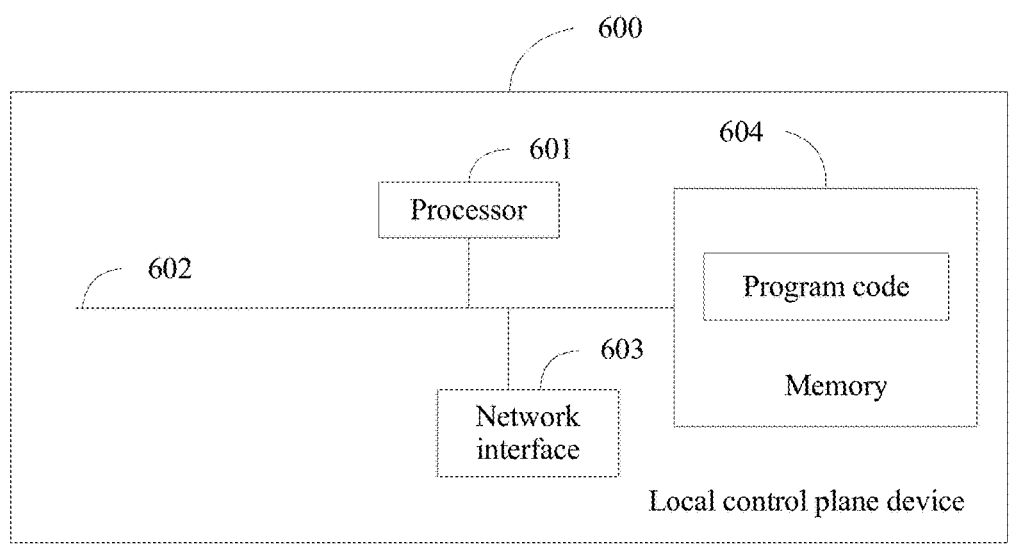
FIG. 9 is a schematic structural diagram of another local control plane device according to an embodiment of the present disclosure.

In another aspect, as shown in FIG. 8, the information obtaining module 510 may further include an information forwarding unit 513 and an information receiving unit 514.

The information forwarding unit 513 is configured to: in the interaction process between the user equipment and the remote control plane device, forward, to the gateway device, forwarding plane modification information sent by the remote control plane device.

The information receiving unit 514 is configured to receive the context information of the user equipment sent by the remote control plane device.

The bearer setup module 520 is configured to set up, by the local control plane device according to the context information of the user equipment, a radio bearer between the user equipment and a base station in which a current camping cell of the user equipment is located.

Specifically, after a service request sent by the user equipment via the base station in which the current camping cell of the user equipment is located is received, the bearer setup module 520 sends a context setup request to the base station according to the context information of the user equipment, so that the base station sets up the radio bearer between the base station and the user equipment.

Referring to FIG. 6, as shown in the figure, the local control plane device in this embodiment of the present disclosure may further include a paging initiation module 530, configured to: after a downlink data arrival notification message is received, initiate paging to the user equipment according to the context information of the user equipment, so that the user equipment switches from an idle state to an active state, and sends the service request via the base station in which the current camping cell is located.

Referring to FIG. 6, as shown in the figure, the local control plane device in this embodiment of the present disclosure may further include an information deletion module 540, configured to: after a context deletion request sent by the remote control plane device is received, delete the stored context information of the user equipment; and send the context deletion request to the gateway device, so that the gateway device deletes the stored context information of the user equipment. It should be noted that the source gateway herein includes a source SGW but does not include a source PGW.

Referring to FIG. 6, as shown in the figure, the local control plane device in this embodiment of the present disclosure may further include a notification sending module 550, configured to send a user state modification notification to the remote control plane device, so that the remote control plane device modifies state information of the user equipment.

FIG. 7 is a schematic structural diagram of another local control plane device according to an embodiment of the present disclosure. As shown in FIG. 7, the local control plane device may include: at least one processor 601, such as a CPU; at least one network interface 603; a memory 604; and at least one communications bus 602. The communications bus 602 is configured to implement connection and communication between these components. The network interface 603 may be a wireless interface, such as an antenna apparatus, and is configured to perform signaling or data communication with another node device. The memory 604 may be a high-speed RAM memory, or may be a non-volatile memory, such as at least one magnetic disk memory. Optionally, the memory 604 may further be at least one storage apparatus located far away from the processor 601. The memory 604 stores a group of program code, and the processor 601 is configured to invoke the program code stored in the memory 604 to perform the following operations:

obtaining context information of a user equipment from a remote control plane device according to an interaction process between the user equipment and the remote control plane device; and setting up, according to the context information of the user equipment, a radio bearer between the user equipment and a base station in which a current camping cell of the user equipment is located.

Optionally, the interaction process between the user equipment and the remote control plane device includes:

an attach request process and a packet data network connection setup process that are initiated by the user equipment.

Optionally, a specific operation in which the processor 601 obtains the context information of the user equipment from the remote control plane device according to the interaction process between the user equipment and the remote control plane device is:

in the interaction process between the user equipment and the remote control plane device, forwarding to a gateway device, forwarding plane modification information sent by the remote control plane device, where the forwarding plane modification information carries the context information of the user equipment; and obtaining the context information of the user equipment by parsing the forwarding plane modification information.

Optionally, a specific operation in which the processor 601 obtains the context information of the user equipment from the remote control plane device according to the interaction process between the user equipment and the remote control plane device is:

in the interaction process between the user equipment and the remote control plane device, forwarding to the gateway device, forwarding plane modification information sent by the remote control plane device; and receiving the context information of the user equipment sent by the remote control plane device.

Optionally, a specific operation in which the processor 601 sets up, according to the context information of the user equipment, the radio bearer between the user equipment and the base station in which the current camping cell of the user equipment is located is:

after receiving a service request sent by the user equipment via the base station in which the current camping cell of the user equipment is located, sending, according to the context information of the user equipment, a context setup request to the base station in which the current camping cell of the user equipment is located, so that the base station in which the current camping cell of the user equipment is located sets up the radio bearer between the base station and the user equipment.

Correspondingly, before receiving the service request sent by the user equipment via the base station in which the current camping cell of the user equipment is located, the processor 601 further performs the following operation:

after receiving a downlink data arrival notification message, initiating paging to the user equipment according to the context information of the user equipment, so that the user equipment switches from an idle state to an active state, and sends the service request via the base station in which the current camping cell is located.

Further, after obtaining the context information of the user equipment from the remote control plane device according to the interaction process between the user equipment and the remote control plane device, the processor 601 further performs the following operations:

after receiving a context deletion request sent by the remote control plane device, deleting the stored context information of the user equipment; and sending the context deletion request to the gateway device, so that the gateway device deletes the stored context information of the user equipment.

Optionally, after setting up, according to the context information of the user equipment, the radio bearer between the user equipment and the base station in which the current camping cell of the user equipment is located, the processor 601 further performs the following operation:

sending a user state modification notification to the remote control plane device, so that the remote control plane device modifies state information of the user equipment.

Optionally, the remote control plane device includes:

a mobility management entity of a conventional EPC network architecture; or a central control plane device of a control-forwarding decoupling network architecture.

Optionally, the context information of the user equipment includes:

a security context of the user equipment and a bearer context of the user equipment, where the bearer context of the user equipment includes a user plane address, a tunnel identifier, a tracking area list, and a globally unique temporary identity of a forwarding plane gateway, and a control plane identifier allocated by the remote control plane device.

An embodiment of the present disclosure further proposes a computer storage medium. The computer storage medium stores a program, and the program includes several instructions that are used to perform some or all of steps in the control methods described in FIG. 1 to FIG. 5A, FIG. 5B, and FIG. 5C in the embodiments of the present disclosure.

In the embodiments of the present disclosure, the local control plane device obtains the context information of the user equipment from the remote control plane device according to the interaction process between the user equipment and the remote control plane device, and further sets up, according to the context information of the user equipment, the radio bearer between the user equipment and the base station in which the current camping cell of the user equipment is located. Therefore, a signaling transmission delay caused when the user equipment switches from an idle state to an active state can be reduced, and a problem of excessive signaling interaction caused by a movement of the user equipment can be avoided.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium may include: a magnetic disk, an optical disc, a read-only memory (ROM), or a random access memory (RAM).

What is disclosed above is merely example embodiments of the present disclosure, and certainly is not intended to limit the protection scope of the present disclosure. Therefore, equivalent variations made in accordance with the claims of the present disclosure shall fall within the scope of the present disclosure.

What is claimed is:

1. A control method, comprising:
obtaining, by a local control plane device, context information of a user equipment from a remote control plane device according to an interaction process between the user equipment and the remote control plane device, wherein obtaining the context information comprises:
in the interaction process between the user equipment and the remote control plane device, forwarding, by the local control plane device, forwarding plane modification information from the remote control plane device to a gateway device, wherein the forwarding plane modification information carries the context information of the user equipment, and
obtaining, by the local control plane device, the context information of the user equipment by parsing the forwarding plane modification information; and
setting up, by the local control plane device according to the context information of the user equipment, a radio bearer between the user equipment and a base station in which a current camping cell of the user equipment is located.

2. The method according to claim 1, wherein the interaction process comprises at least one of: an attach request process initiated by the user equipment and a packet data network connection setup process initiated by the user equipment.

3. The method according to claim 1, wherein obtaining the context information comprises: in the interaction process between the user equipment and the remote control plane device, receiving, by the local control plane device, the context information of the user equipment from the remote control plane device.

4. The method according to claim 1, wherein setting up the radio bearer comprises: in response to receiving a service request from the user equipment via the base station, sending, by the local control plane device according to the context information of the user equipment, a context setup request to the base station.

5. The method according to claim 4, wherein before the local control plane device receives the service request, the method further comprises:
in response to receiving a downlink data arrival notification message, initiating, by the local control plane device, paging to the user equipment according to the context information of the user equipment.

6. The method according to claim 1, wherein after obtaining the context information, the method further comprises:
in response to receiving a context deletion request from the remote control plane device, deleting, by the local control plane device, the stored context information of the user equipment; and sending, by the local control plane device, the context deletion request to the gateway device.

7. The method according to claim 1, wherein after setting up the radio bearer, the method further comprises:
sending, by the local control plane device, a user state modification notification to the remote control plane device, wherein the user state modification notification is used for modification of state information of the user equipment.

8. A local control plane device, comprising:
a transceiver; and
a processor configured to;
obtain context information of a user equipment from a remote control plane device according to an interaction process between the user equipment and the remote control plane device, including
in the interaction process between the user equipment and the remote control plane device, forwarding forwarding plane modification information from the remote control plane device to a gateway device, wherein the forwarding plane modification information carries the context information of the user equipment, and
obtaining the context information of the user equipment by parsing the forwarding plane modification information; and
set up, according to the context information of the user equipment, a radio bearer between the user equipment and a base station in which a current camping cell of the user equipment is located.

9. The local control plane device according to claim 8, wherein the interaction process comprises at least one of: an attach request process initiated by the user equipment and a packet data network connection setup process initiated by the user equipment.

10. The local control plane device according to claim 8, wherein the transceiver is configured to receive the context information of the user equipment from the remote control plane device.

11. The local control plane device according to claim 8, wherein the processor is configured to: after a service request from the user equipment via the base station is received, send according to the context information of the user equipment, a context setup request to the base station.

12. The local control plane device according to claim 11, wherein the processor is further configured to: after a downlink data arrival notification message is received, initiate paging to the user equipment according to the context information of the user equipment.

13. The local control plane device according to claim 8, wherein the processor is further configured to: after a context deletion request from the remote control plane device is received, delete the stored context information of the user equipment; and send the context deletion request to the gateway device.

14. The local control plane device according to claim 8, wherein the transceiver is further configured to send a user state modification notification to the remote control plane device, wherein the user state modification notification is used for modification of state information of the user equipment.

15. The local control plane device according to claim 8, wherein the remote control plane device comprises: a mobility management entity of a evolved packet core (EPC) network architecture; or a central control plane device of a control-forwarding decoupling network architecture.

16. A wireless communications system, comprising:
a remote control plane device, configured to perform interaction process with a user equipment;
a gateway device; and
a local control plane, communicatively coupled to the remote control plane device and configured to;
obtain context information of the user equipment during the interaction process, including
in the interaction process between the user equipment and the remote control plane device, forwarding forwarding plane modification information from the remote control plane device to the gateway device, wherein the forwarding plane modification information carries the context information of the user equipment, and obtaining the context information of the user equipment by parsing the forwarding plane modification information, and set up a radio bearer between the user equipment and a base station in which a current camping cell of the user equipment is located according to the context information.

17. The system according to claim 16, further comprising: the base station, configured to receive a context setup request from the local control plane device, and set up the radio bearer.

18. The system according to claim 16, wherein the interaction process comprises at least one of: an attach request process initiated by the user equipment and a packet data network connection setup process initiated by the user equipment.

19. The system according to claim 16, wherein the local control plane is configured to receive the context information of the user equipment from the remote control plane device.

20. The system according to claim 16, wherein the local control plane is configured to: after a service request from the user equipment via the base station is received, send according to the context information of the user equipment, a context setup request to the base station.

* * * * *